United States Patent
Volpe

(10) Patent No.: US 10,666,775 B1
(45) Date of Patent: May 26, 2020

(54) INTEGRATED PACKET GENERATOR AND CHECKER

(71) Applicant: Amazon Technologies, Inc., Seattle, WA (US)

(72) Inventor: Thomas A. Volpe, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 33 days.

(21) Appl. No.: 15/391,241

(22) Filed: Dec. 27, 2016

(51) Int. Cl.
*H04L 12/26* (2006.01)
*G06F 11/27* (2006.01)
*H04L 29/06* (2006.01)
*H04L 12/823* (2013.01)

(52) U.S. Cl.
CPC .............. *H04L 69/22* (2013.01); *H04L 43/10* (2013.01); *H04L 43/106* (2013.01); *H04L 43/18* (2013.01); *H04L 43/0852* (2013.01); *H04L 47/32* (2013.01)

(58) Field of Classification Search
CPC ......... H04L 1/242; H04L 1/243; H04L 1/244; H04L 43/50
See application file for complete search history.

(56) References Cited

U.S. PATENT DOCUMENTS

| | | | | |
|---|---|---|---|---|
| 6,052,362 | A * | 4/2000 | Somer | .............. H04L 43/50 370/246 |
| 7,500,264 | B1 | 3/2009 | Leavy et al. | |
| 8,149,730 | B1 | 4/2012 | Aybay et al. | |
| 2003/0026287 | A1 | 2/2003 | Mullendore et al. | |
| 2003/0185210 | A1 * | 10/2003 | McCormack | ........... H04L 43/50 370/392 |
| 2004/0030977 | A1 * | 2/2004 | Jiang | ........................ H04L 43/50 714/742 |
| 2006/0072582 | A1 | 4/2006 | Bronnimann et al. | |
| 2007/0008897 | A1 | 1/2007 | Denton et al. | |
| 2007/0223388 | A1 | 9/2007 | Arad et al. | |
| 2008/0137543 | A1 | 6/2008 | Mitra | |
| 2009/0109864 | A1 * | 4/2009 | Wang | .................. G06F 11/2221 370/249 |
| 2011/0145572 | A1 | 6/2011 | Christensen et al. | |
| 2011/0149973 | A1 | 6/2011 | Rothenberg et al. | |
| 2011/0188386 | A1 | 8/2011 | Nicholson et al. | |
| 2011/0286324 | A1 | 11/2011 | Bellagamba et al. | |
| 2012/0275460 | A1 | 11/2012 | Klotsche et al. | |
| 2013/0064095 | A1 | 3/2013 | Chew et al. | |
| 2013/0148503 | A1 | 6/2013 | Hutchison et al. | |
| 2014/0115182 | A1 | 4/2014 | Sabaa et al. | |
| 2014/0153406 | A1 | 6/2014 | Brolin et al. | |
| 2014/0380099 | A1 | 12/2014 | Astigarraga et al. | |
| 2015/0312186 | A1 | 10/2015 | Giura et al. | |
| 2016/0205072 | A1 | 7/2016 | Dusi et al. | |

(Continued)

OTHER PUBLICATIONS

U.S. Appl. No. 15/391,291, filed Dec. 27, 2016, Titled: Network Device With Integrated Packet Generators or Packet Checkers.

(Continued)

*Primary Examiner* — Hoon J Chung
(74) *Attorney, Agent, or Firm* — Kilpatrick Townsend & Stockton LLP

(57) ABSTRACT

Disclosed are techniques for implementing packet checkers and packet generators within a network device. The packet checkers and packet generators can each operate in an internal mode to test functionality of the network device or in an external mode to test functionality of an external device.

14 Claims, 17 Drawing Sheets

(56) References Cited

U.S. PATENT DOCUMENTS

| | | |
|---|---|---|
| 2016/0337115 A1 | 11/2016 | Lu et al. |
| 2017/0019326 A1* | 1/2017 | Patel .................. H04L 43/50 |
| 2017/0366442 A1 | 12/2017 | Marelli et al. |
| 2018/0013657 A1 | 1/2018 | Cantwell et al. |
| 2019/0007200 A1 | 1/2019 | Shah et al. |

OTHER PUBLICATIONS

U.S. Appl. No. 15/391,331, filed Dec. 27, 2016, Titled: Testing Computer Networks in Real Time.
U.S. Appl. No. 15/391,373, filed Dec. 27, 2016, Titled: Generating Network Packet Centric Signatures.

* cited by examiner

US 10,666,775 B1

INTEGRATED PACKET GENERATOR AND CHECKER

BACKGROUND

Network devices, such as network switches, are used to transport data packets through computer networks. Network devices can receive data packets and, based on information in each data packet, such as an address, forward the data packet to an appropriate different network device. Modern network devices can concurrently forward a large number of differing types of packets per second to many different destinations. To support such functionality, network devices can be exceedingly complex and may be difficult to troubleshoot, validate, and/or debug, especially when deployed within a computer network and actively forwarding data packets.

Thus, there is a need for improvement in the field of network devices.

BRIEF DESCRIPTION OF THE DRAWINGS

Various embodiments in accordance with the present disclosure will be described with reference to the drawings, in which.

DETAILED DESCRIPTION

Figure 1A:
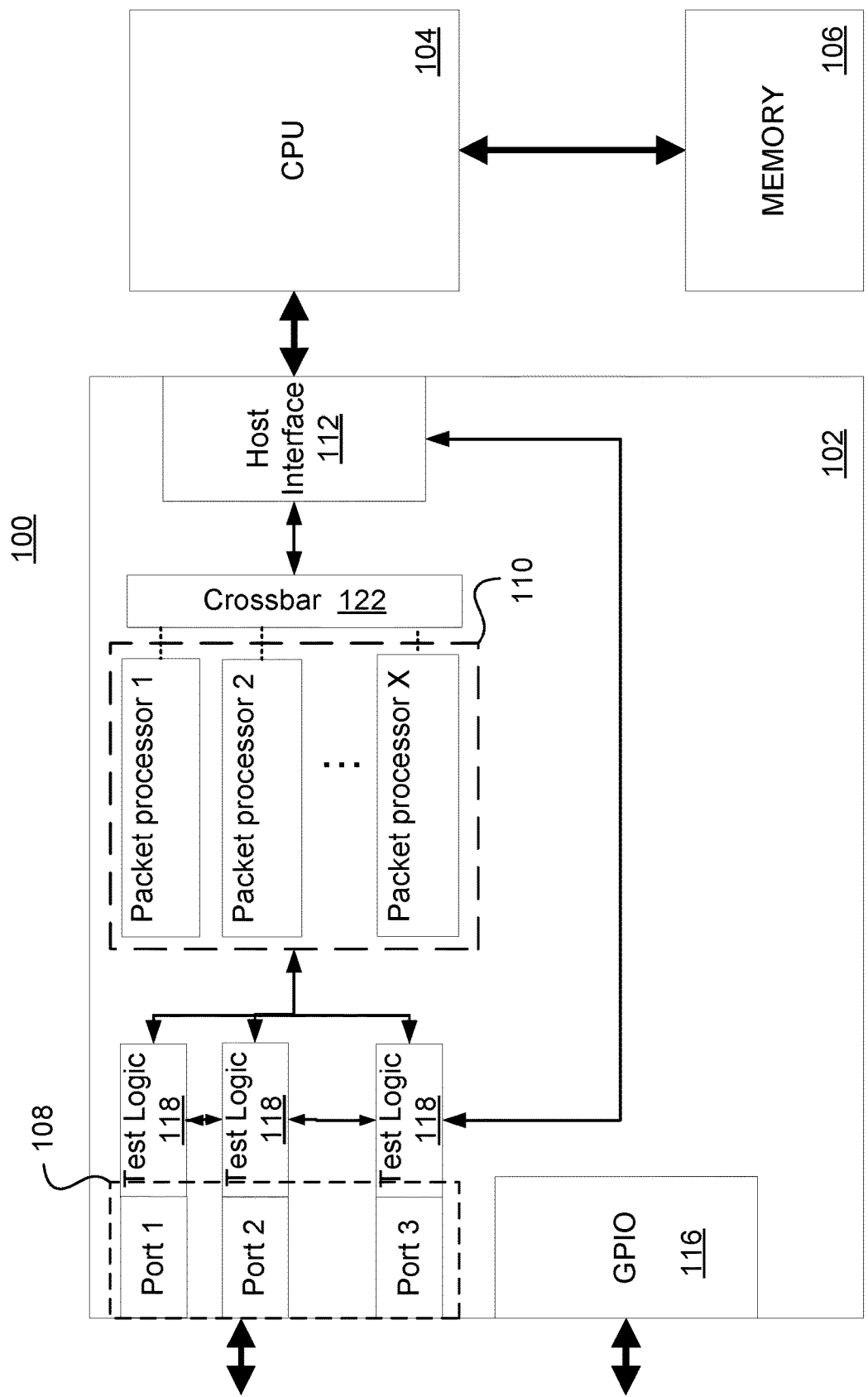
FIG. 1A illustrates an example network device.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Network devices, such as network switches or network routers, can be used to forward received data packets to one of several destinations. As network devices advance, so do capabilities of network devices to forward large volumes of data packets at increasingly higher speeds. Certain network devices may be capable of forwarding tens of billions of data packets per second. For each data packet, a decision can be made, by the network device, as to where to best forward each data packet (e.g., to an egress interface, to a destination device, etc.).

Furthermore, modern network devices may be capable of processing many disparate types of data packets, such as Internet Protocol version 4 (IPv4), IPv6, Address Resolution Protocol (ARP), AppleTalk, MPLS, Precision Time Protocol (PTP), etc.

Relatively complex techniques in the form of hardware and/or instructions may be required to enable the ability to route upwards of billions of data packets per second of differing types (creating multitudes of possible routing variations). A particular network device having such functionality may be operable to route data packets under many different scenarios (e.g., routing differing amounts(s) of type(s) of data packets to certain address(es) under varying conditions). As such, there may be many permutations of operational scenarios for a single network device. It can be desirable for a network device to be configured to, with a low failure rate and with low latency, route data packets under the many differing scenarios. Validation of a network device may become a complex and tedious process that may require expensive and/or specialized test equipment.

For example, in conventional systems specialized test equipment may be used to generate a series of test data packets to test a network device under test (DUT). One or more packet checkers may be used to verify that the series of packets were correctly routed by the network DUT. However, a network DUT may be configured to route many series of packets concurrently and each of the series may include varying different types of data packets. Thus, a validation test may require many packet generators and checkers that are capable of concurrently generating streams of data packets and verifying correct routing of the streams. Furthermore, a test plan may include generating many different combinations of types of data packets and streams to gain a level of confidence that the network DUT will operate in its intended environment(s) and/or meet its operational requirements. Additionally, test equipment packet generators and/or checkers may be required to operate at a speed that the network DUT is designed to operate at when routing data packets. As new network devices are developed with new capabilities and/or speeds, the test equipment may therefore be required to be upgraded or replaced, which may be a costly endeavor.

Furthermore, due to the complex nature of testing network devices, most testing of network devices is limited to pre-deployment of the network device in a live network system. However, it would be desirable to troubleshoot, test, and/or further validate a network device, links between network devices, an inter-networked group of network devices, and/or a network infrastructure. For example, a network device may be deployed into a network wherein a plurality of network devices work in tandem to route data packets across the network. Debugging and/or validating individual network devices or communication links between network devices deployed within a network may be difficult, costly, or impossible using external/dedicated test equipment. For example, it may be difficult to insert test equipment into a network without modifying the underlying network infrastructure and possibly rendering a test invalid. Additionally, the test equipment may not be able to fully duplicate and/or react to traffic flowing through the network and may therefore alter the functionality of the network. As another example, test equipment may simply be incapable of generating the amount or pattern of data packet traffic that induced the error or the exact conditions that caused an error may be unknown and/or intermittent.

Testing in a deployed network may also be desirable in order to validate a specific network configuration including several network devices and/or operational patterns. Verifying several network devices may require the generation of more series of packets in varying combinations as compared to testing a single network device. For example, one or more test scenarios may be created that may require fine control of location(s) within a network, time(s), type(s), or packet or payload value(s), in order to correctly validate functionality of a network configuration or troubleshoot a specific failure, for example. Such an undertaking can be exceedingly difficult or costly using dedicated test equipment given the limitations of such equipment disclosed herein (e.g., limited numbers of channels, likely interference with network traffic and/or modification of the underlying network infrastructure, etc.).

Testing during live deployment can also be performed in order to troubleshoot or debug a network device or the network infrastructure itself. For example, a specific network device within an infrastructure may be faulty under certain conditions (e.g., certain network traffic patterns that have occurred during live deployment). These specific conditions that cause a specific fault may be difficult to characterize. Furthermore, certain failures may be intermittent. Characterizing such faults may be difficult and, instead, it may be beneficial to monitor network activity during live deployment to aid in such characterization. Furthermore, recreating failure conditions that result from live deployment may be difficult using dedicated test equipment.

External test equipment may also be inadequate to identify an error within a network device. For example, a network device may have various functional blocks and/or pipeline stages that data packet passes through for routing. Test equipment may be able to inject one or more data packets into a device to be processed by all such functional blocks and/or pipeline stages, but may be incapable of inserting a test packet between functional blocks and/or pipeline stages. Thus, external test equipment may be incapable of identifying or characterizing a fault within a network device at a fine level of granularity. Similarly, a fault within an interconnect between two network devices within a deployed network may be difficult to effectively locate through the use of external test equipment as the network may need to be altered to install such equipment.

Disclosed are techniques that can be used to debug, validate, and generally test network devices. The techniques can include a plurality of network devices each including a plurality of data packet generators and/or packet checkers. Each network device can utilize its internal generator(s)/checker(s) to test functionality of one or more packet processors of the network device. When used in conjunction, the network devices can transmit and/or receive test packets between the network devices to aid in testing of a network infrastructure and/or interoperability between the network devices. Furthermore, the network devices can be utilized for testing purposes with the aforementioned checker(s)/generator(s) while routing live network traffic through a deployed network. Each of the devices can be used in tandem to generate complex test scenarios and patterns across a network to be able to more accurately test the network in more real-world representative scenarios. In certain embodiments, a signature can be generated by a network device to more efficiently store results of test scenarios. The techniques can be used to test functionality of a singular network device during design, production, or after being deployed at an integrated circuit, circuit card, or device level. The techniques can enable identification and/or characterization of failures during live deployment that otherwise may be unobtainable, costly, and/or time consuming.

Example Network Systems/Devices

FIG. 1A illustrates an example system 100 that can be integrated into, for example, a network device such as a network switch. System 100 includes an integrated circuit 102 that can be an Application Specific Integrated Circuit (ASIC). Integrated circuit 102 can include several processing module(s), such as packet processors 110, that can be configured to process and/or route data packets. Integrated circuit 102 can be coupled to a central processing unit (CPU) 104 and/or memory 106. Each of integrated circuit 102, CPU 104, and/or memory 106 can be manufactured on a separate integrated circuit die. For example, CPU 104 can be manufactured on an integrated circuit die, integrated circuit 102 can be manufactured on a different integrated circuit die and memory 106 can be manufactured on one or more different integrated circuit dies. In certain embodiments, CPU 104 and the integrated circuit 102 (and/or memory 106) may be implemented on the same integrated circuit die.

CPU 104 can orchestrate certain operations of the integrated circuit 102. For example, CPU 104 can execute one or more instructions stored in memory 106. The instructions can include, without limitation, an operating system, instructions to modify operations of integrated circuit 102 including, e.g., changing forwarding destinations/mechanisms of packet processors 110, collecting information (such as statistics or debugging information) from integrated circuit 102, and/or commanding powering of certain modules of integrated circuit 102. By separating CPU 104 onto a separate circuit and/or die, CPU 104 can be developed, manufactured, and/or improved independently from integrated circuit 102. Furthermore, integrated circuit die size(s) can be restrained by not including component(s) of CPU 104.

CPU 104 can include a processing core configured to implement x86, ARM, or other instruction sets in any combination. CPU 104 can include a field programmable gate array (FPGA), digital signal processor (DSP), programmable logic device (PLD), ASIC, or other. In certain embodiments, CPU 104 can include a graphics processing unit (GPU) or other parallel processor(s). CPU 104 can include memory including cache, non-volatile, volatile, primary, secondary, or other. Memory 106 can be external memory that can be read from or written to by integrated circuit 102 and/or CPU 104. Memory 106 can be used to store data generated by integrated circuit 102 for later processing by CPU 104, for example.

Commands instigated by CPU 104 can be performed to modify routing functionality of integrated circuit 102. Commands to modify routing functionality of network device(s) from the CPU 104 may be considered as originating from a control plane. Such commands can be directed to the integrated circuit 102 of the network device itself for modifying routing of data packets by the network device. The integrated circuit 102 may be considered as residing in the data plane and configured to route the data packets through the network based on information configured by the CPU 104 of the control plane in the integrated circuit 102. Data packets can be routed by a network device, but the packet payload contained therein may not be examined by the network device. As such, the network device may act to direct the data packets on the data plane so that they are received by the intended recipient.

Integrated circuit 102 can include Ethernet ports 108 that can be used to send or receive data packets. Data packets may be formatted according to a variety of network protocols, such as IPv4, IPv6, Level 2 (L2), User Datagram Protocol (UDP), Transmission Control Protocol (TCP), IP-in-IP, Generic Routing Encapsulation (GRE), Multiprotocol Label Switching (MPLS), or other data packets. In certain embodiments, integrated circuits can include tens or hundreds of Ethernet ports 108. Packet processors 110 can be coupled to Ethernet ports 108 via an internal bus to enable data packets to be received via Ethernet ports 108 to be processed at packet processors 110 and/or be transmitted from packet processors 110 via Ethernet ports 108. Some or all of packet processors 110 can each be configured to parse, encapsulate, de-encapsulate, capture, drop, forward, or perform other operations on a data packet and on a packet by packet basis. In certain embodiments, each of packet processors 110 may be associated with a corresponding test logic block 118 and/or one of Ethernet ports 108. As disclosed herein, a test logic block 118 can include a packet generator, packet checker, and/or packet parser. In certain embodiments, integrated circuit 102 can include tens or hundreds of packet processors 110 and/or test logic blocks 118. In certain example embodiments, packet processors 110 (and the remainder of integrated circuit 102) can be operable to process data packets at 1, 10, 25, 100, or 400 Gbps (Gigabits per second).

In certain embodiments, each of packet processors 110 can be substantially similar in operation, enabling synthesis of a relatively large parallel array of packet processors 110, each with similar capabilities. Each of packet processors 110 can be pipelined with multiple stages that act on packet(s) processed by a particular one of the packet processors 110.

Packet processors 110 can be coupled together via crossbar 122. As one example use case, a data packet may be received by one of Ethernet ports 108. The data packet may be intercepted by a corresponding test logic block 118 (discussed further below) and/or passed to one of packet processors 110 via a corresponding test logic block 118. The packet processor 110 and/or test logic block 118 can correspond to one of Ethernet ports 108 that received the data packet. The packet processor 110 that received the data packet may then proceed to determine, based on header information contained in the data packet, an appropriate Ethernet ports 108 for outputting the data packet. The crossbar 122 can be utilized for routing the data packet to the correct egress Ethernet port 108 for transmitting the data packet from the network device. As the data packet transmitted from the network device, it can also pass through another test logic block 118 associated with the egress Ethernet port 108. As illustrated, Crossbar 122 can be coupled to each of packet processors 110.

Forwarding table(s) can be stored onboard memory of integrated circuit 102 and can be accessed by packet processors 110, for example, to select an address, interface or Ethernet port for forwarding of received data packet(s). Although not shown, forwarding table(s) may be integrated within each of the packet processors 110. Host Interface 112 can enable relatively high bandwidth communications between integrated circuit 102, CPU 104, and/or memory 106. Although not illustrated, CPU 104 and/or Host Interface 112 can include a PCIe controller or other interface controller. General purpose input/output (GPIO) 116 can enable various tertiary interface functions of integrated circuit 102 including discrete, serial, or other interface schemas.

The registers corresponding to packet processors 110 can store information pertaining to one or more operations of packet processors 110 including, for example, a number of dropped packets, a number of forwarded packets, a number of received packets, a number of trapped packets, a number of packets forwarded to a specific address or specific prefix, a number of packets received from a specific address, a number of exceptions, or an average time to process a packet. Furthermore, in certain instances, the registers corresponding to packet processors 110 can also store various state information associated with the packet processors 110. For example, certain registers may reflect information associated with the current usage or availability of certain buffers and/or entries of the packet processors 110.

In certain embodiments, CPU 104 can access each of the registers to periodically collect information stored therein. The information can be used to aid in validation and/or debugging operations of device 102. For example, as disclosed herein, a number of test packets can be generated and transmitted to device 102 for device 102 to process the test packets. Information within the registers can be used to determine, for example, if the test packets were correctly received and/or routed by device 102. The operations of the device can include correctly routing test packets to a specific location, trapping a test packet that is not correctly addressed/formatted, correctly de-encapsulating and/or re-encapsulating a test packet, etc. In certain embodiments device 102 can include memory (not shown) that can be a buffer for trapping test and other packets. In such embodiments, CPU 104 may access the memory to obtain trapped packet(s). As used herein, the term trapping means to prevent a data packet from being transmitted from a device (e.g., through normal routing operations). A determination as to whether to trap a specific data packet can be made based on routing information contained therein, information of a packet payload, metadata, or other. Metadata, as used herein, can be information used for routing or forwarding decisions for a data packet. Metadata can include information generated for a data packet and/or information extracted from a data packet.

Test Logic 118 can include one or more packet generators, packet checkers and/or packet parsers. Each of the packet generators or packet checkers can correspond to a specific Ethernet port 108 and/or packet processor 110 of the network device. Distributing the packet generators and packet checkers across ports can enable various features disclosed herein such as pre-silicon testing (i.e, design verification before manufacturing of the device), post silicon testing (i.e., before deployment of device), testing during live deployment, external testing (e.g., between network devise), internal testing (of a network device), etc. Test Logic 118 can receive one or more signals from CPU 104 to configured test logic 118 as disclosed herein. Test logic 118 can be configured to generate specific patterns of test packets (e.g., quantities, types, lengths, destinations, etc.) internally to network device 102 to test various functionalities of packet processors 110 and/or between network devices (including network device 102). Test Logic 118 can include one or more functionalities shared with packet processors 110, such as packet parsers that include parsing logic. Test Logic 118 can also include signature generation functionality, packet matching functionality, or other features disclosed herein to further increase testing capabilities of network device 102.

Figure 1B:
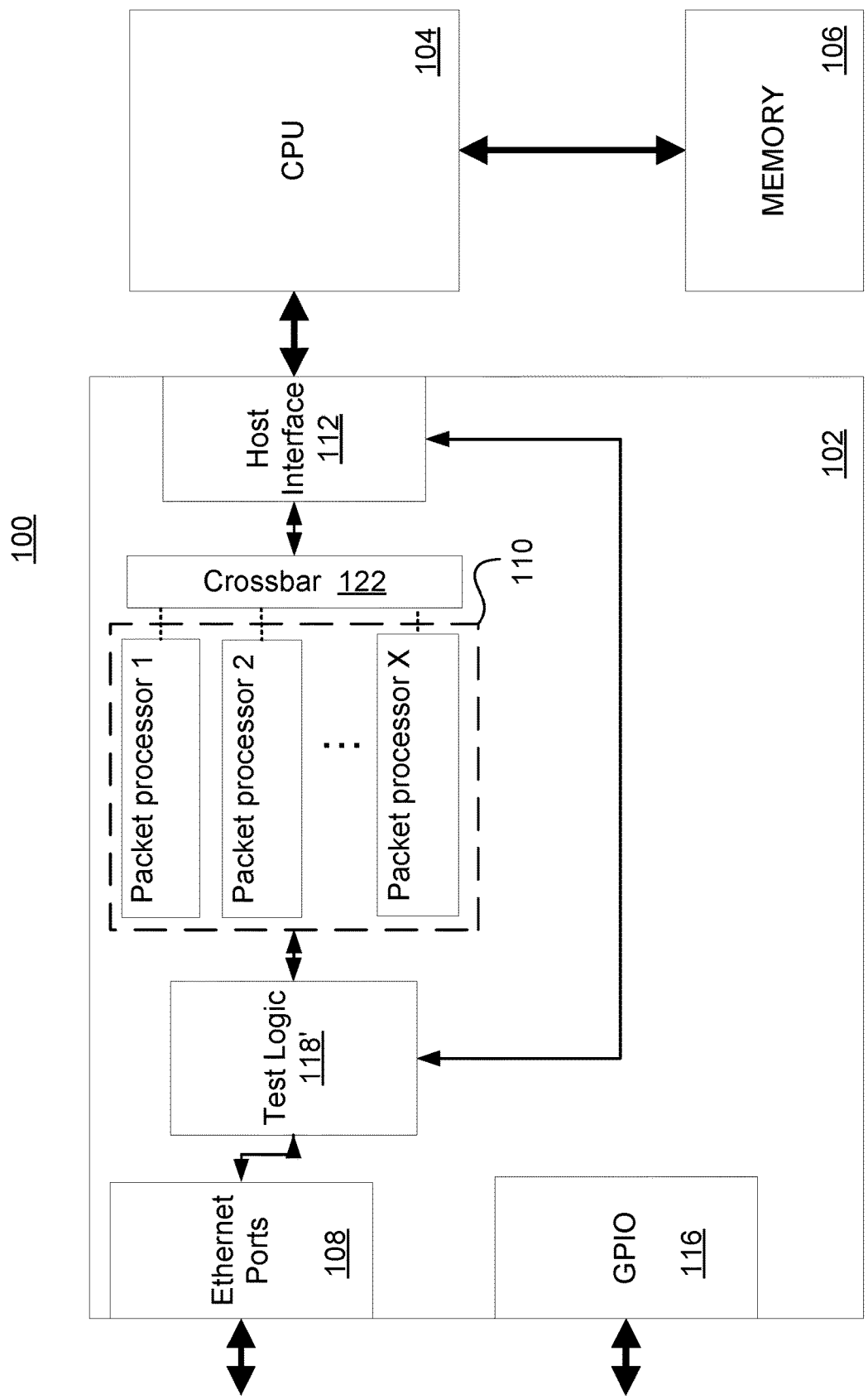
FIG. 1B illustrates another example network device.

FIG. 1B illustrates another embodiment of system 100 wherein test logic 118' can be shared between packet processors 110. Test logic 118' can be similar in functionality to test logic 118 and can include packet generation, packet checking, and/or packet parser(s) as described herein. Although not illustrated, a crossbar or similar logic may be implemented to distribute packets between test logic 118' and one or more of packet processors 110 in various combination. Thus, test logic 118' can correspond to any of ports 108 and/or packet processors 110 in a variety of combinations.

Example Packet Processor

Figure 2:
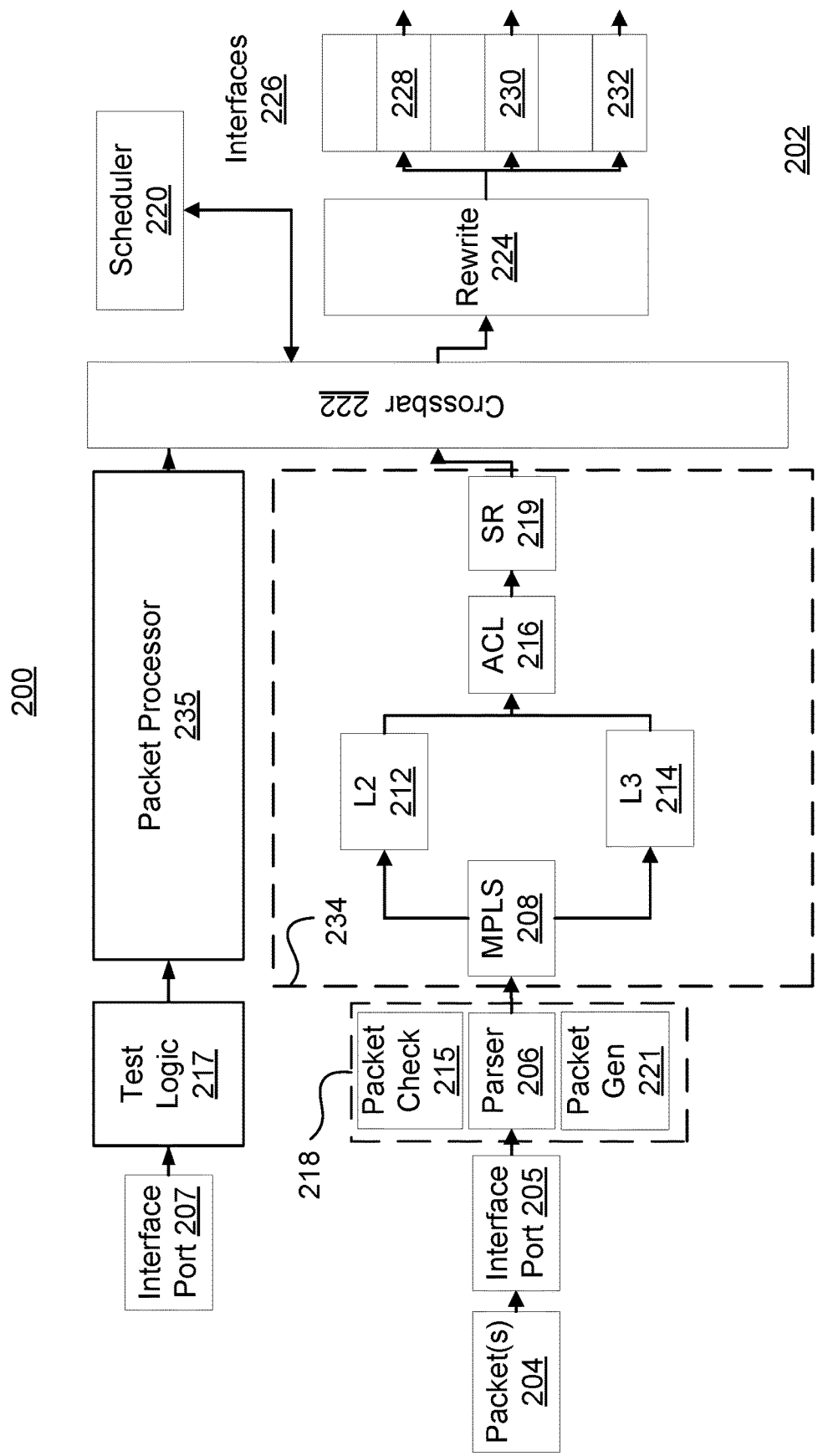
FIG. 2 illustrates an example network device with packet processor details.

FIG. 2 illustrates a logical block diagram of a network device 200 illustrating techniques for processing and forwarding of data packets. Network device 200 can include packet processor 234 that can be similar to one of packet processors 110 of integrated circuit 102. Functionality of packet processor 234 can be implemented using pipelined stages. Pipelining can support a packet processor's capabilities to process data packets that support high-speed network data transfer operations, including forwarding information, lookups and other packet processing operations. Packet processor 234 can be implemented to provide forwarding of data packets as part of a data plane so that forwarding may be performed without software-based techniques.

Data packet(s) 204 can be received via a network interface, such as an interface port 205. Interface port 205 can provide a physical layer (PHY) interface. A Media Access Control (MAC) layer interface can be implemented via interface port 205. Data packet(s) 204 can be analyzed to detect a valid data packet flow and segment the flow into datagrams (e.g., packets/frames). For instance, the PHY layer may receive and transmit data across physical connections (e.g., such as electrical signals received over twisted-pair coaxial cable or optical signals received over optical fiber). The PHY layer may implement different techniques dependent on the speed or type of network interface configuration (e.g., Ethernet 10 base-T, 100 base-TX, and 100 base-T forms), such as encoding, multiplexing, synchronization, clock recovery, and/or data serialization. Various signaling standards, such as IEEE 802.2, may govern the performance of the PHY layer consistent with the open systems interconnection (OSI) model for communications. The MAC layer may delimit frames and packets from the flow of data. Error checking may also be implemented at the MAC layer, checking for different errors, such as frame check sequence (FCS), interframe gap enforcement, and frame preambles.

Packet parser 206 can receive data packets and separate a packet header from a packet payload and/or generate metadata. Packet parser 206 can be part of test logic 218, as illustrated. Test logic 218 can have similar functionality to test logic 118 (e.g., test logic 218 may also include a packet checker 215 and/or packet generator 221). In certain embodiments, packet parser 206 can instead be part of packet processor 234 or shared between test logic 218 and packet processor 234. Packet parser 206 can parse header information (e.g., one or more packet headers) to determine and/or extract data for making forwarding decisions for the packet. For example, packet parser 206 can extract different layer headers (e.g., L2 and L3 headers) included in an Internet protocol (IP) version 4 packet, such as the source MAC address, the destination MAC address, the source IP address, the destination IP address, and port numbers. Using information from the layer headers, the data packets can be forwarded to Multiprotocol Label Switching (MPLS) module 208. MPLS module 208 can use MPLS techniques to make forwarding decisions based on information in the header. In certain cases, an MPLS tunnel can be exited and packets can be forwarded based on L2 or L3 routing decisions respectively at L2 forwarding module 212 or L3 routing module 214. In certain instances, data packets may pass through certain logical blocks or stages of the packet processor 234 without being processed. For example, if the data packet received at the MPLS module 208 does not have an MPLS header, the MPLS module 208 may merely pass the packet through to the next block/stage of the packet processor 234.

Packet parser 206 can also generate metadata corresponding to packet(s) 204. The metadata may be used internal to network device 202 to determine routing decisions and/or to aid in testing operations, for example. The metadata can include port information, time information, unique packet identifier(s), etc. The metadata can be routed to one or more logic blocks of device 202.

A data packet can be forwarded to L2 forwarding module 212 or L3 routing module 214 in order to determine forwarding and routing decisions based on information in the packet header (e.g., packet metadata) extracted by packet parser 206. For example, L2 forwarding module 212 can locate appropriate forwarding information through the use of Forwarding Table(s).

Forwarding Table(s) can, in certain embodiments, be logically partitioned within L2 forwarding module 212. L2 forwarding module 212 can perform lookups for data in layer 2 (L2) portions of the packet to perform L2 forwarding. L2 forwarding may access a MAC address table in forwarding tables (not shown) to perform two lookups (which may be in parallel or in series). The first lookup may be performed with a key extracted from the packet header at packet parser 206 (e.g., a VLAN and source MAC address), to determine whether an entry for the packet is present in Forwarding Table(s). If the source MAC address is unknown, then a mapping determination may be made to map the source MAC address to a port identified in the packet header. If the MAC address is known but attached to a different port than indicated by the MAC address table, then an operation may be performed to move the source MAC address to the port identified in the packet header. Otherwise, the MAC address is known in the MAC address table. Another lookup to the MAC address table may also be performed at another key (the VLAN and the destination MAC address). The data packet may be forwarded if the MAC address table contains an entry for the destination MAC address owned by a network device (otherwise other operations may be performed, such as trapping the data packet for the CPU, bridging the packet to a certain interface, or flooding out of all ports and a spanning tree protocol (STP) forwarding state).

L3 routing module 214 can perform lookups for data in layer 3 (L3) portions of the packet to perform L3 routing. For example, IP headers for the packet may be evaluated with respect to entries and tables such as a routing or next hop table, to determine routing to be performed. The previous examples of packet processing are not exhaustive, as many other forwarding techniques may be employed, including, but not limited to, spanning tree protocol (STP) state checking, access port VLAN handling, VLAN membership checking, MAC2ME lookup, broadcast/multicast forwarding to a host CPU for the switch, tunnel start/termination lookup, longest prefix match, source MAC lookup, learn filtering, learn requests, moved source MAC checking, multiprotocol label switching (MPLS) label lookups, traffic class mapping, time-to-live (TTL) checks, packet actions based on ingress/egress access control lists (ACL), and front/or various other destination resolution lookups. As a packet processor 234 makes forwarding decisions about a data packet, the decisions can be maintained as part of the packet metadata. The packet metadata can be provided to scheduler 220 for scheduling determinations.

Forwarding Table(s) may be implemented in one or multiple types of storage elements, such as various memory elements (e.g., a CAM, such as TCAM, and/or random access memory) to store table data for performing different forwarding decisions. Forwarding Table(s) may include a VLAN table, MAC address table, routing table, adjacency table, next hop table, tunnel start table, virtual routing and forwarding identifier table, tunnel termination table, and/or actions table. Each of these different tables may be utilized to retrieve or determine packet forwarding decisions, tunneling decisions, and associated modifications that may need to be made to data packets.

Access Control List (ACL) module 216 can, based on rules, compare information obtained from a data packet header or elsewhere to make a determination if the data packet header is allowed to be directed to specific destination(s). For example, ACL module 216 can include a list of source address(es) of data packets that are allowed to be forwarded to certain address(es). ACL module 216 can also include a list of source address(es) of data packets that are not allowed to be forwarded to certain address(es). Additional information can be included within ACL module 216 such as protocol version(s), identifying information, or other information.

Register(s) (not illustrated) can be coupled to MPLS module 208, L2 forwarding module 212, L3 routing module 214, ACL module 216, Parser 206, rewrite module 224, and/or statistics and redirect (SR) module 219, for example, in any combination. Register(s) 236 can collect information pertaining to number(s) of data packets that are forwarding individually by each module or by several of the modules. Non-limiting examples of use of register(s) 236 include counting a number of packets denied by ACL module 216 or a number of packets routed by L3 routing module 214. It should be understood that this information can be further delineated, such as a number of packets forwarded based on matching certain prefix(es), type(s) of packets, etc.

Crossbar 222 can be a switch for routing data packets that are received at one ingress interface port and processed through a packet processor 234 to transmit out through another egress interfaces 226 (e.g., interface 228, interface 230, interface 232). SR module 219 can be configured to collect statistics information regarding operation of remaining modules of packet processor 234.

Crossbar 222 can be similar to crossbar 122. Network device 202 can include a plurality of packet processors, such as packet processors 234 and 235. The packet processors can each have similar capabilities and enable network device 202 to concurrently process a plurality of sequences of data packets received at respective ports. As illustrated, a particular sequence of data packets can be processed by packet processor 234 and a corresponding one of interface 226 selected for output of the particular sequence of packets. Interfaces ports 205 and/or 207 can be included within interfaces 226. Thus, each port of network device 202 may be used to input or output data packet(s) as needed. Although not illustrated, packet processor 235 can include logic blocks that correspond to the logic blocks of packet processor 234. Furthermore, packet processor 235 may correspond to test logic 219 that can be similar to test logic 217.

Scheduler 220 can control the buffering of packets and scheduling of operations within the network device 202. For example, scheduler 220 can implement a memory management unit to allocate available memory segments for buffering stored packets. Scheduler 220 can also implement a memory management unit to allocate packets from a buffer for final processing and egress. Scheduler 220 can be provided with appropriate metadata for a packet to determine, for example, a destination port for the packet and/or relative priority of the packet. Once a data packet has been scheduled, scheduler 220 can utilize crossbar 222, PHY interface, and/or a MAC layer interface to transmit data packets. Rewrite module 224 can be used to rewrite encapsulation or other information after a packet has traversed crossbar 222. The rewrite module 224 can rewrite fields in the packet to, for example, enter or exit a tunnel, modify QoS fields, or update a next-hop address.

Example Packet Generator and Packet Checker

Figure 3:
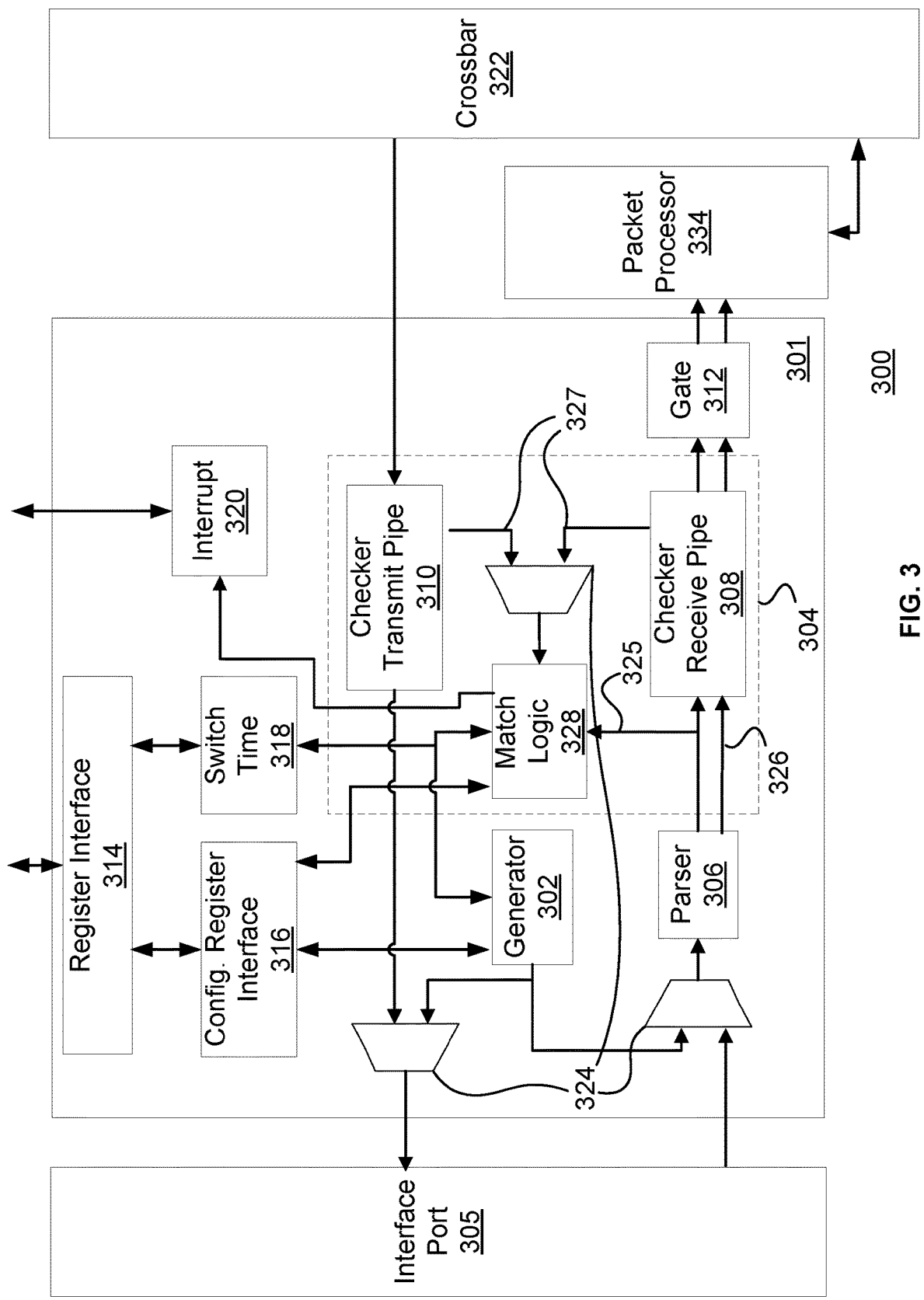
FIG. 3 illustrates an example network device with packet generation and packet checking logic.

FIG. 3 illustrates logic blocks of a network device 300, which can be similar to, and include functionality of, network device 202. For example, packet parser 306 can be similar to packet parser 206. Interface port 305 can be similar to interface port 205 and packet processor 334 can be similar to packet processor 234. Note that parser 306, although illustrated as being separate from packet processor 334 can share functionality with and/or be integrated within packet processor 334. Illustrated is test logic 301 that can correspond to test logic 118 of FIG. 1 and test logic 218 of FIG. 2. Test logic 301 can include a packet generator, such as packet generator 302, and/or a packet checker, such as packet checker 304. Packet checker 304 can include a packet checker transmit pipeline 310, a packet checker receiving pipeline 308, and/or match logic 328. A packet generator, as used herein, is logic that is configured to generate a data packet including generation of a packet payload and header information. A packet checker, as used herein, is logic that can compare information contained within a data packet and determine, based on the information contained therein, whether the data packet is a test type of data packet. A test type of data packet can be determined by examining metadata associated with a data packet and/or test information contained within a payload of a packet, as disclosed herein.

As illustrated, test logic 301 can be substantially disposed between interface port 305 and packet processor 334/crossbar 322. As illustrated in FIG. 3, network device 300 can also comprise a plurality of packet processors and interface ports, each of which may be associated with a corresponding test logic 301 block. As disclosed herein, the location of packet generator 302 and packet checker 304 within network device 300 can enable test logic 301 to test the network device 300 and external network device(s) (including communication links with the external network device(s)) in a variety of manners. A plurality of switches 324 (that may be implemented using multiplexers) can configure test logic 301 to generate and/or check test types of data packets in an internal mode or an external mode. In the internal mode, test logic 301 can be configured to test functionality of one or more packet processors (such as packet processor 334) of network device 300. In external mode, test logic 301 can be configured to transmit a test packet generated by packet generator 302 out of an interface port (such as interface port 305) to test a network device external to network device 300 and/or network infrastructure. Furthermore, in external mode, test logic 301 can be configured to receive, at packet checker 304, a test type data packet that has been generated by a device external to network device 300.

As illustrated, packet generator 302 can, depending on a configuration of switches 324 can operate in external or internal mode. In external mode, the packet generator 302 generates a test type of data packet and transmits the test type of data packet to interface port 305 and/or packet parser 306. If transmitted out through interface port 305, the test type of data packet can be received at a device external to network device 300. On the other hand, in internal mode, the test type of data packet is transmitted to the packet parser 306 and can be used to test internal functionality of network device 300. For example, the test type of data packet can be processed via packet processor 334 and test functionality of packet processor 334 in a variety of ways. Packet parser 306 can, for example, parse header information from a packet payload of a received data packet. Packet parser 306 may also generate metadata for one or more data packets based upon header information contained therein. A packet payload can include information to be transferred between devices via a data packet (e.g., between the originator of the data packet and the intended final recipient(s)). A packet payload can, in certain embodiments, be generated by a packet generator of a device to populate payload information of a data packet for a test type of data packet. For a non-test type of data packet, the payload information could contain data to be transferred between devices. Header information can include information indicating source, destination, or other information for transmittal of the packet payload between two or more devices within a network. Examples of header information include header(s) corresponding to respective layer(s) of the Open Systems Interconnection model (OSI model). Header information can be used by a packet processor to select a port for outputting each data packet from a network device. Metadata can include tertiary information that can be generated based on information contained within header information of a data packet and used for forwarding decisions. For example, an expected destination port number for a test type of data packet may be stored as metadata. As disclosed herein, test information can be used to identify a test type of data packet. Furthermore, metadata, payload data, header information, or test information can be used to further identify specific ones of test types of data packets (i.e., match on specific data packets). Test information, as disclosed herein, can be used to identify and characterize certain aspect(s) of test type of data packets that can be used to troubleshoot and/or validate network device(s). The test information can be included within a payload field of a test type of data packet so that forwarding of the test type of data packet can be unaffected by the test information. For example, one or more fields of information can be populated within a payload of a data packet with test information that can be used to identify and characterize test types of data packets.

Each of checker transmit pipeline 310 and checker receive pipeline 308 can determine if a data packet is a test type of data packet (e.g., based on identifying certain value(s) within or generated from a data packet and/or a checksum generated from data within a data packet) from data packets contained therein. If checker transmit pipeline 310 or checker receive pipeline 308 identify test information within a test type of data packet, they can transmit test information 327 to match logic 328. Match logic 328 can use the metadata 325 from packet parser 306 to identify a specific test type of data packet from test type of data packets identified by checker transmit pipeline 310 or checker receive pipeline 308. Match logic 328 can perform one of several actions on a matched data packet. For example, match logic 328 can log information corresponding to a test type of data packet (such as statistical information), store the test type of data packet itself, store a portion of the data packet, trigger an interrupt, trigger a packet to be generated, etc. The action performed for a particular test type of data packet can be configurable. For example, register interface 314 can be used to interface with a CPU (CPU 104 of FIG. 1, for example) that can configure packet checker 304 and/or packet generator 302 via configuration register interface 316. Note that register interface 314 can be shared by multiple logic blocks within network device 300 to provide a common interface for configuration of logic blocks of network device 300. Switch time 318 can be used to generate a time stamp for a particular generated test type of data packet and/or for comparison to a timestamp of a checked data packet to determine latency information. The timestamp can be transmitted between functional blocks as metadata or embedded into a test type of data packet. Interrupt logic 320 can be used to generate an interrupt to a CPU, for example, when packet checker 304 determines a match to a certain test type of data packet. The CPU can be interrupted to, for example, trigger the CPU to examine a test type of data packet that has been stored.

As disclosed, match logic 328 can work in conjunction with packet checker transmit pipeline 310 and packet checker receive pipeline 308. Packet checker receive pipeline 308 can, for example, receive metadata 325 and header information and packet payload 326 from packet parser 306. Packet checker receive pipeline 308 can extract test information 327 from the packet and/or packet payload 326 and transmit the test information 327 to match logic 328. This information can be used to determine various information about a test type of data packet as disclosed herein (e.g., for matching purposes). Packet checker transmit pipeline 310 can, in a similar fashion, extract test information 327 from a packet received via crossbar 322 (that may be generated by a one of many packet generators of network device 300). Gate 312 can be used to prevent data from a test type of data packet from entering packet processor 334 (such as when a test type of data packet is received from an external device).

Figure 4:
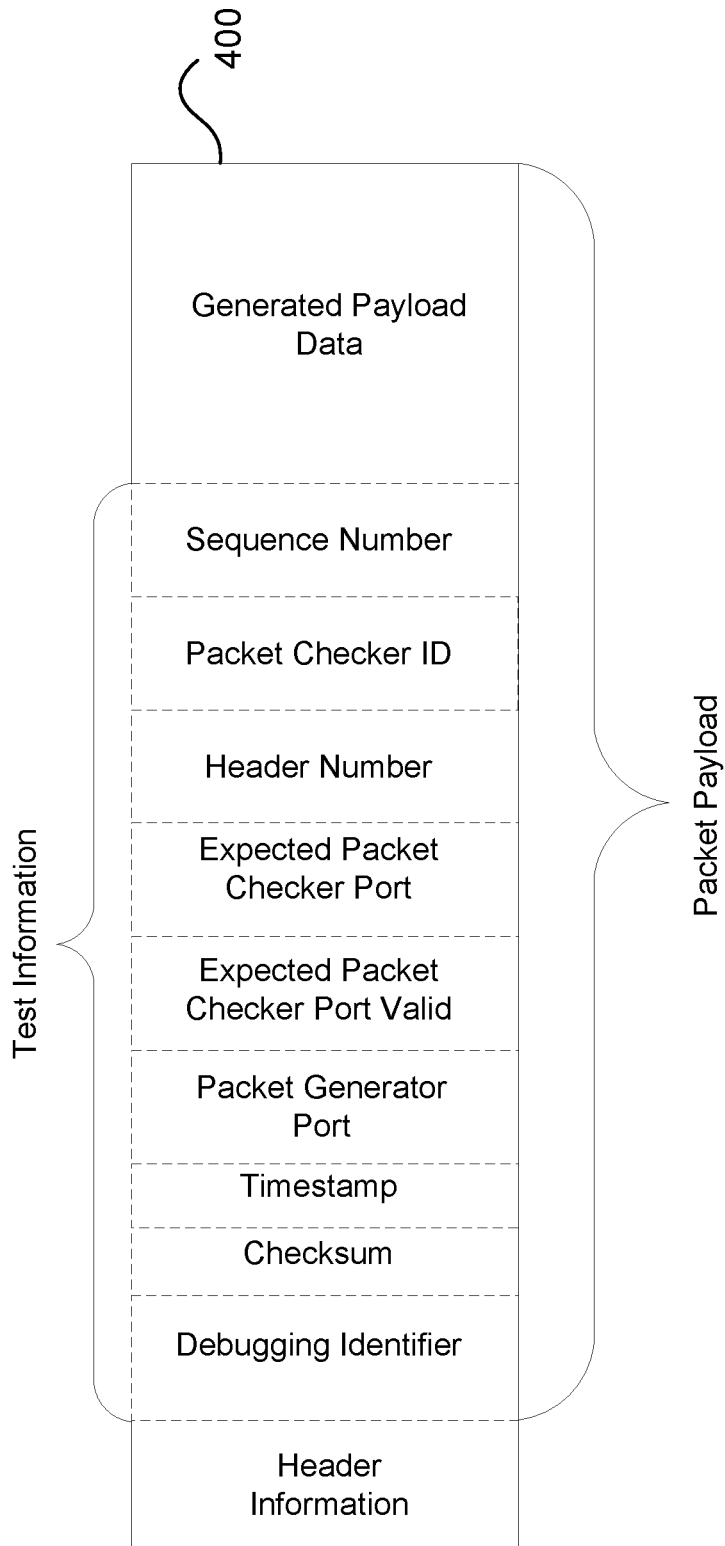
FIG. 4 illustrates example fields of a data packet.

FIG. 4 illustrates an example data packet 400 that can include header information, a packet payload, and, optionally, test information. The packet payload can be stored as data that can be appended to or encapsulated by the header information. The packet payload can be generated by a first network device to be transferred internally within the network device from one port to another port or across a computer network, to a second network device. As data packet 400 traverses the computer network, the packet payload may be unaffected by forwarding of data packet 400 through the device or network. Thus, network devices for routing data packet 400 through a network may generally lack functionality to generate and/or inspect a packet payload. The packet generators disclosed herein include functionality to generate test type of data packets based on commands and/or information received via a control plane. The generation of the test types of data packets can include generating both a packet header (using packet header templates) and packet payload for a test type of data packet so that the test type of data packet can more realistically emulate a non-test type of data packet. Generation of a packet payload can be performed in a variety of manners by a packet generator. For example, a packet payload can be populated by random or semi-random information (e.g., seeded by a sequence number). In certain embodiments, a packet payload can be populated with repeated or sequential numbers or as specified by a CPU coupled to a network device with a packet generator (via a control plane). In certain embodiments, the test type of data packets may be generated using a profile. For example, the profile can include various attributes of a set of test type of data packets to be generated (such as length, payload type/pattern, etc.). The profile can be set by configuration registers and/or stored in memory coupled to a packet generator. The profile can include a percentage of certain attributes of data packets to be generated (e.g., 50% of length 1, 25% of length 2, etc.).

Data packet 400 is illustrates as being a test type of data packet. As illustrated test type of data packets can include test information within a packet payload. Test information encompasses data that is specifically generated and/or embedded into a data packet for test purposes. In certain embodiments, as illustrated in FIG. 4, test information is included in a packet payload of a test type of data packet. The test information can include one or more of the following fields, as illustrated:

Debugging Identifier—a value used to identify a specific test type of data packet and/or to determine if a data packet is a test type of data packet.

Checksum—a checksum of field(s) in test information. In certain embodiments, once a preliminary check is performed for identifying that the data packet is a test type of packet using the Debugging Identifier, a secondary check may be performed for confirming that the data packet is in fact a test type of packet by checking the checksum value, since the checksum is also unique to the test type of packet.

Timestamp—a timestamp of generation of the packet. In certain embodiments, the timestamp can be used to determine latency information for a data packet to traverse between two network device or within a network device, for example.

Packet Generator Port—a port identifier that corresponds to the packet generator that generated the packet. In certain embodiments, the packet generator port field can be used to test if a test type of data packet was correctly forwarded from the port identified by the packet generator port field to another port.

Expected Packet Checker Port Valid—indicates whether a packet checker should determine whether a test type of data packet was received at an expected egress port. In certain embodiments, this field can be used as a flag for a receiving packet checker to determine whether the packet checker should perform a test using the expected checker port field.

Expected Checker Port—indicates the egress port that is expected to receive and check the packet. In certain embodiments, the expected checker port field can be used to test if a test type of data packet was correctly sent to the port identified by the expected checker port field.

Header Number—index of a header used by the packet generator to generate the packet. This field can indicate a template number used to generate header information and/or an index into memory from which a header template is stored, for example.

Packet Checker ID—field that can be used for filtering or checking at a packet checker. This field can be used to group packets for reporting statistical information corresponding to a group of packets.

Sequence Number—can start at 0 and increment for each packet generated. The sequence number can be used to seed a generated payload generation or other information. A packet checker can verify if a correct payload was received from a value of the sequence number field.

The sequence number can also be used for correlation of statistical information.

Payload Data Select—can indicate a pattern used for generating a packet payload (e.g., random value seeded by sequence number, sequential, etc.). A packet checker can verify if a correct payload was received from a value of the payload data select field.

Payload Length—indicates a length of a packet payload. A packet checker can verify if a correct payload was received from a value of the payload length field.

In certain embodiments, packet generator(s) can be configured to insert one or more errors into header information. Error(s) introduced into test types of data packets can be used to test functionality of packet processor(s), for example. As disclosed herein, packet generator(s) can work in unison with packet checker(s) to trap, modify, and/or generate test types of packets to test functionality of network device(s) (e.g., certain test type(s) of data packet(s) can be generated based on a successful match by a packet checker and/or packet checkers can verify test types of data packets generated by the packet generators).

The header information can be used by network device(s) within a computer network (such as network switches) to route a data packet (such as data packet 400) through a computer network. The header information can include one or more IP or other source or destination address(es). The header information can encapsulate the packet payload for transport within the device and/or between devices. In certain embodiments, packet payloads can be encapsulated at multiple levels (e.g., may be encapsulated by multiple headers and/or footers). Header information, as used herein, can be included in one or more headers and/or one or more footers. In certain embodiments, a layer of information can correspond to a layer of the OSI model. Data packet 400 can include an L2 header corresponding to level 2 of the OSI model. Depending on a level of an outer header of a data packet and/or a level that a network device operates at to forward, send, or receive data packet(s), inner header information can be included within a packet payload. Certain network devices can operate at difference levels of encapsulation/headers depending on various aspects of a specific data packet, such as a MAC address, for example. Certain network devices operating at a specific level of the OSI model, for example, may consider header information for other levels as payload information.

Internal and External Testing Modes

Figure 5:
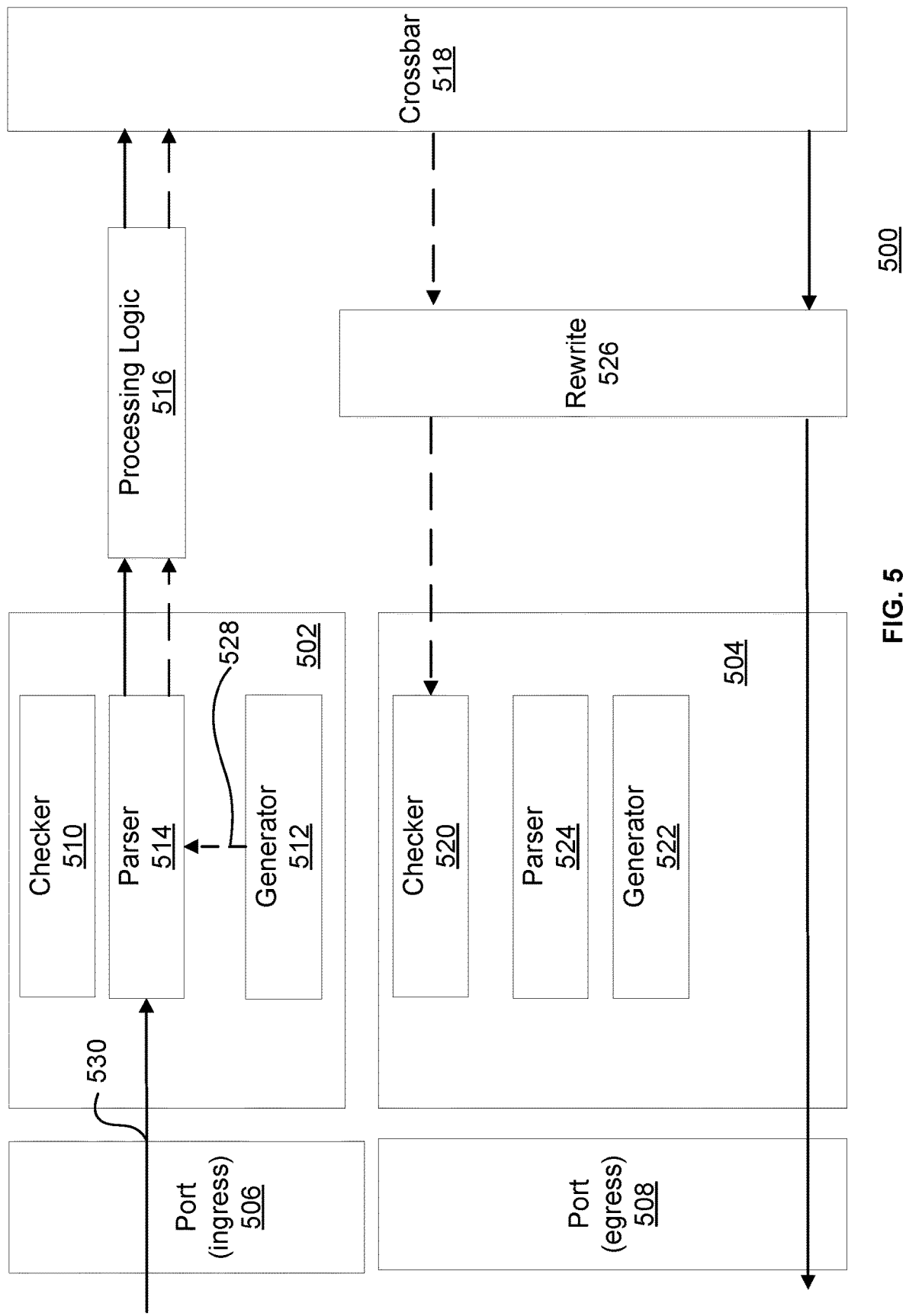
FIG. 5 illustrates an example internal mode of operation for a packet checker and packet generator of a network device.

FIG. 5 illustrates an example network device 500 that can be similar to network device 200 or 300. Also included are test logic modules 502 and 504. Each of test logic modules 502 or 504 can include functionality of test logic 301. Port 506 and port 508 can each be similar to one of interfaces 226. Packet checkers 510 and 520 can each be similar to packet checker 304. Packet generators 512 and 522 can each be similar to packet generator 302. Parsers 514 and 524 can each be similar to parser 306. Processing Logic 516 can each be similar to packet processor 334. Crossbar 518 can be similar to crossbar 322. Rewrite logic 526 can be similar to rewrite logic 224.

In FIG. 5, network device 500 is illustrated as operating in an internal mode. A sequence of data packets 530 is illustrated as being received by network device 500 via port 506. Sequence of data packets 530 can be parsed via parser 514 to identify, for example, header information, a packet payload, metadata, and/or test information. Using the header information, sequence of data packets 530 can be routed via processing logic 516 to port 508 via crossbar 518. A sequence of test type of data packet(s) 528 can be generated by packet generator 512. Sequence of test type data packet(s) 528 can be similarly parsed by parser 514 and routed by processing logic 516. As illustrated, sequence of test type data packet(s) 528 is routed, via crossbar 518, to packet checker 520 corresponding to port 508. Packet checker 520 can be operable to identify and/or collect data from sequence of test type data packet(s) 528. The collected data can be used to verify that processing logic 516 correctly routed sequence of test type data packet(s) 528. Although not illustrated, network device 500 may contain large number (e.g., hundreds) of ports and corresponding packet generators, packet checkers, and processing logic blocks. Thus, depending on the generated test types of data packets, functionality of a network device 504 can be tested in a variety of ways. For example, any of packet processors (and/or processing logic blocks) can be tested in any combination. Furthermore, as illustrated, network device 500 can be tested while network device 500 is deployed in a live network and is routing sequence(s) of data packets (such as sequence of data packets 530). Sequence of data packets 530 can be a sequence of data packets generated by one or more devices within a deployed network. Thus, network device 500 can be tested while deployed in a computer network and actively routing data packets within the computer network.

Figure 6:
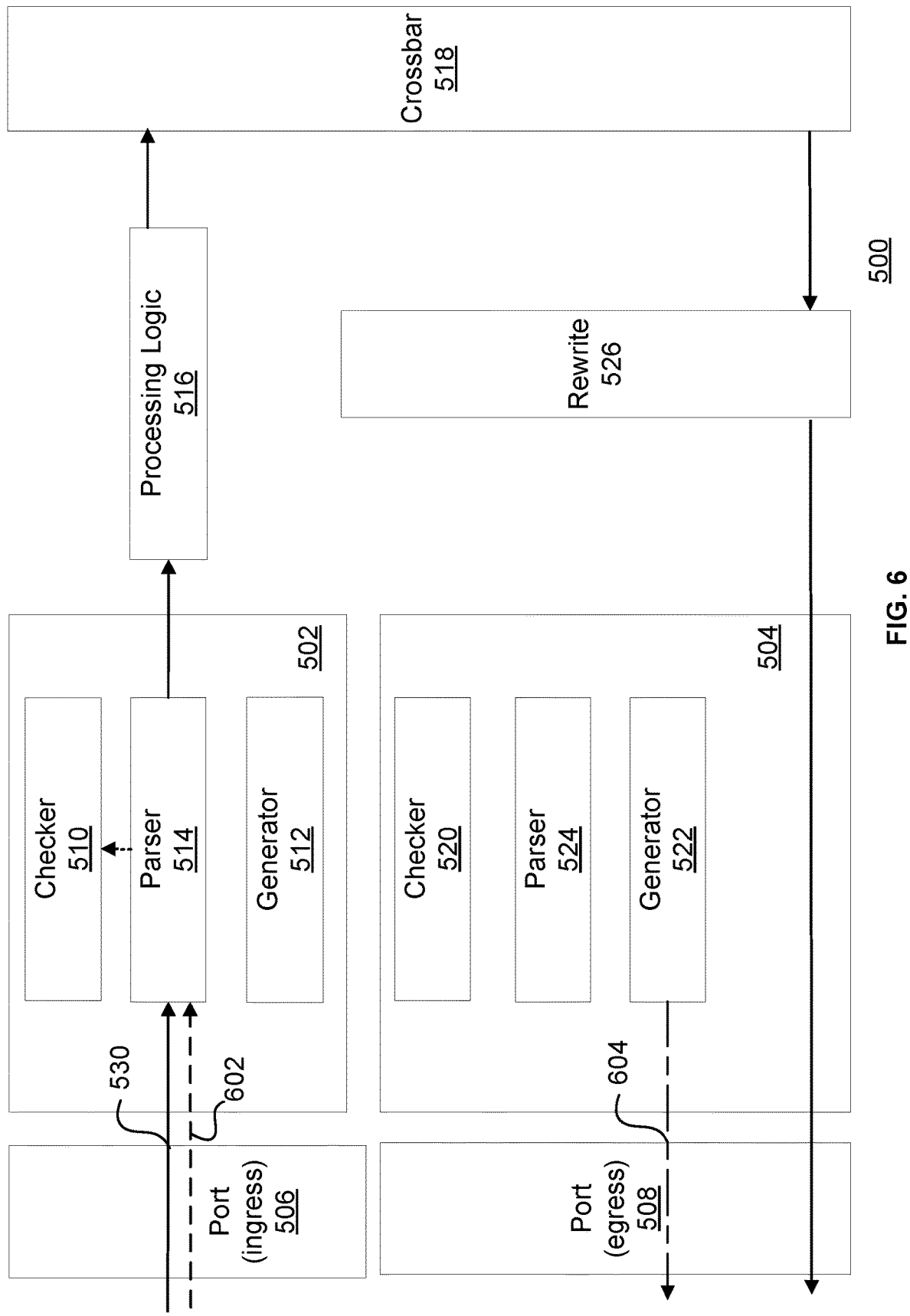
FIG. 6 illustrates an example external mode of operation for a packet checker and packet generator of a network device.

FIG. 6 illustrates test logic modules of a network device 500 operating in external mode. In FIG. 6, a sequence of test type of data packet(s) 602 has been received at port 506 and parsed by parser 514. Data parsed from sequence of test type of data packet(s) 602 is illustrated as being received at packet checker 510 to identify and/or perform one or more actions based on the reception of sequence of test type of data packet(s) 602. Sequence of test type of data packet(s) 602 can be generated by a packet generator of another network device external to network device 500. Sequence of test type of data packet(s) 602 can be used to verify that the external network device is operating correctly, that a portion of network infrastructure and communication links between the two network devices is operating correctly, and/or a network device between the two network devices is operating correctly.

A second sequence of test type of data packet(s) 604 is illustrated as being generated by packet generator 522. The second sequence of test type of data packet(s) 604, as illustrated, can be routed out through a port (such as port 508) of network device 500 to an external network device to test functionality of a network in which network device 500 is deployed (including the external device and/or network infrastructure), for example.

Packet Generation Throttling

As illustrated in FIGS. 5 and 6, a particular packet processor of a network device disclosed herein can receive data packets from a network device during live deployment, for example, as well as test types of network packet(s) generated by a packet generator. In certain embodiments, logic can be included within a network device to throttle generation of test types of network packets in several manners. For example, a length of a generated test type of network packet can be adjusted based on an amount of traffic received by a network device. In certain embodiments, the rate at which test type of network packets are generated can be adjustable depending upon a received amount of traffic flow. In certain embodiments, interframe gap times (i.e., time periods between generated data packets) can be selected by a packet generator depending on traffic conditions and/or a target interframe gap time/generation rate. This throttling can aid in preventing corruption of the live flow of network packets by preventing exceeding processing capabilities of a packet processor, for example. Furthermore, the throttling can be used to meet a target traffic flow amount (for stress testing, for example). As such, a target or a profile can be specified by a CPU, for example, for a packet generator to meet. The packet generator can, depending on an amount of traffic of received at one or more port(s) of a network device, internally select a rate, length, or other attributes of test type of data packets generated by the packet generator to meet the target or profile.

In certain embodiments, a packet generator can identify an interframe gap time between two data packets received in a sequence of data packets. The packet generator can opportunistically utilize an identified interframe gap time exceeding a threshold to insert a test type of data packet into the sequence of data packets without resulting in a dropped data packet (e.g., without overtaxing capabilities of a network device). The packet generator may also vary a length of a test type of data packet to fit within an identified interframe gap time. For example, while the packet generator generates a test type of packet, in the interim, if a new non-test type of data packet (aka., data packet belonging to live traffic) is observed, the packet generator may attenuate the payload and calculate the appropriate checksum based on the attenuated payload for the test type of data packet to avoid interfering with the normal routing and forwarding of non-test type of data packets. For example, the attenuating the payload can include generating the payload at different lengths and updating a checksum accordingly. In certain embodiments, data within the payload may be modified to match a checksum in order to avoid time intensive checksum calculations.

Packet Checker

Figure 7:
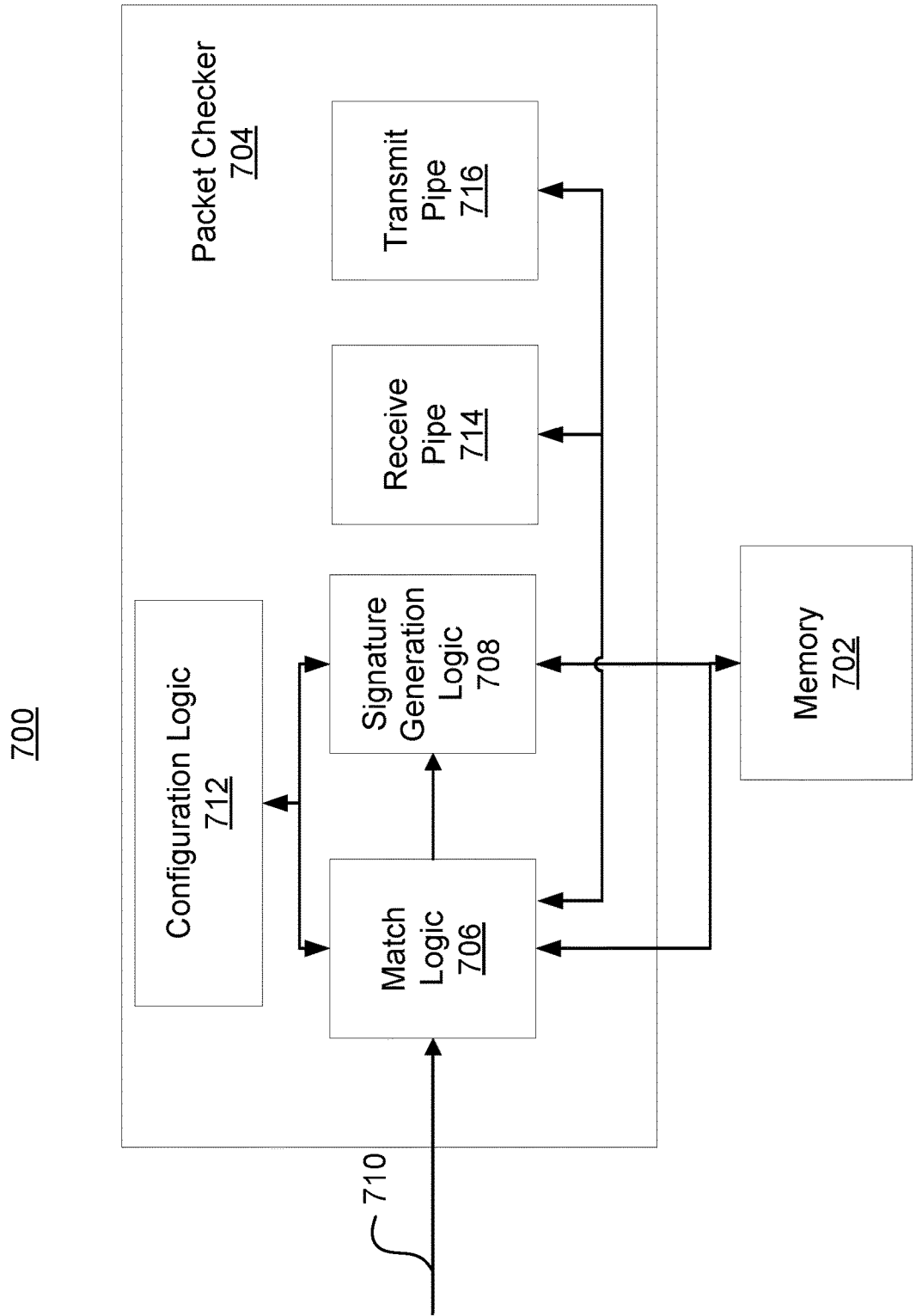
FIG. 7 illustrates an example packet checker.

FIG. 7 illustrates a device 700 that can include packet checker 704. Packet checker 704 can be similar to packet checker 304. Device 700 can be similar to device 300, 200, or 100. Packet checker 704 can perform cyclic redundancy check, checksum, or other integrity tests on a received packet. Packet checker can include match logic 706. Match logic 706 can be configured to determine if a specific type of data packet is (1) a test type of data packet or (2) a specific test type of data packet. For example, a data packet 710 (and/or information extracted from a data packet by parser, for example), can be received at match logic 706. The match logic can determine if the data packet is a test type of data packet by, for example, examining a field in the header information or the received metadata. For example, a test type of data packet may contain a debugging identifier field that contains a certain value that can be read by match logic 706 to determine a match. By examining a payload of a data packet and/or by verifying a checksum generated from fields of the data packet, a determination may be made that the data packet is a test type of data packet. Although performing a checksum is used as an example, differing operations can be performed within field(s) of a data packet to identify a test type of data packet. For example, a cyclic redundancy check can be performed on certain field(s). Results of these checks can be verified against an expected value. Other checks can be performed to determine if a data packet is a test type of data packet. For example, a structure of a data packet can be examined (e.g., a test type of data packet may have a certain header or footer), or other attributes of, or associated with, a data packet may be examined.

After a determination that a data packet is a test type of data packet, match logic 706 can perform additional matching techniques to identify certain test types of data packets. For example, match logic 706 may be configured to examine certain field(s) of a test type of data packet. The fields may be contained in packet and/or test information portions of a data packet. Example fields can include a port at which a test type of data packet was generated, a header number, an ID of a specific packet checker, a sequence number, or a timestamp. This information can be included as test information in a test type of data packet by a packet generator. In certain embodiments, wild-carded matching can be performed. Upon a successful match, several action(s) can be performed. For example, an interrupt can be generated for a CPU, packet checker(s) or generator(s) can be triggered to start or stop, the data packet can be trapped in memory (partially or wholly), a signature can be generated, or a latency measurement obtained.

Signature generation logic 708 can be used to generate a signature that represents attribute(s) of a plurality of data packets. For example, the signature can include information that can be used to ascertain data packet destination/source address(es), latencies, specific errors, etc. The signature can be used to minimize an amount of space needed to store information regarding multiple data packets (such as within memory 702) or expedite verification that certain test scenarios completed successfully.

In certain embodiments, a bloom filter may be used to store information in a concise manner, regarding several data packets in memory 702. The signature generation logic 708 can hash field(s) of several data packets into a bloom filter array (storing a bloom filter signature). For example, the results of the hash technique(s) performed on the field(s) can be stored within the bloom filter array. The results can be logically ORed against a value stored within the bloom filter array. The bloom filter signature can be used to determine, for example, if a test type of data packet was erroneously received at an incorrect port. In certain embodiments, the signature can be compared to a signature stored in memory and, if the signatures do not match, an interrupt can be triggered for a CPU. Network device 700 may include many instances of packet checkers. Thus, the ability of each packet checker to independently trigger when anticipated test results were not obtained can reduce CPU overhead for verifying successful test completion.

Memory 702 can operate in one of several modes. In a mode, for example, memory 702 can be used by packet checker 704 to store packet and/or byte count information corresponding to test types of data packets received by packet checker 704 (and/or matched by packet checker or a number of packets used to generate a bloom filter signature). In certain embodiments, fields from a header of a test type of data packet can be used as an index into memory 702 (such as a header identifier and sequence number, for example). In certain embodiments, the fields can be used as an index to a counter stored within memory 702 for updating or otherwise accessing a counter stored therein. For example, a counter can be updated when a specific test type of data packet is matched and/or received or generated at a certain port. In a mode, memory 702 can be used to capture data packets (or portions of data packets). For example, after a successful match by match logic 706, matched packets can be stored within memory 702 for later retrieval by a CPU. Memory 702 can also be used to store latency information for test type of data packets received at packet checker 704. As disclosed herein, a timestamp stored within metadata or test information of a packet can be compared to a system clock to determine a latency between packet generation and packet checking. Latency statistics can be determined for a plurality of data packets. In certain embodiments, a histogram can be generated and/or stored for the latencies to minimize memory space requirements and/or expedite latency determinations.

Configuration logic 712 can include one or more configuration registers, for example, that may be set by a CPU (not illustrated). The CPU may utilize configuration logic 712 to configured packet checker 704 to operate in internal or external mode, to configure match logic 706 (e.g., which field(s) or value(s) to match on, what action to perform as a result of a match, etc.), or to configured signature generation logic 708 (e.g., what field(s) to generate signature(s) from, etc.). Receive pipe 714 and transmit pipe 716 can be corresponding configured to process sequences of data packet, identity test types of data packets from the sequences, and transmit test information to match logic 706, as illustrated and described in FIG. 3.

Figure 8:
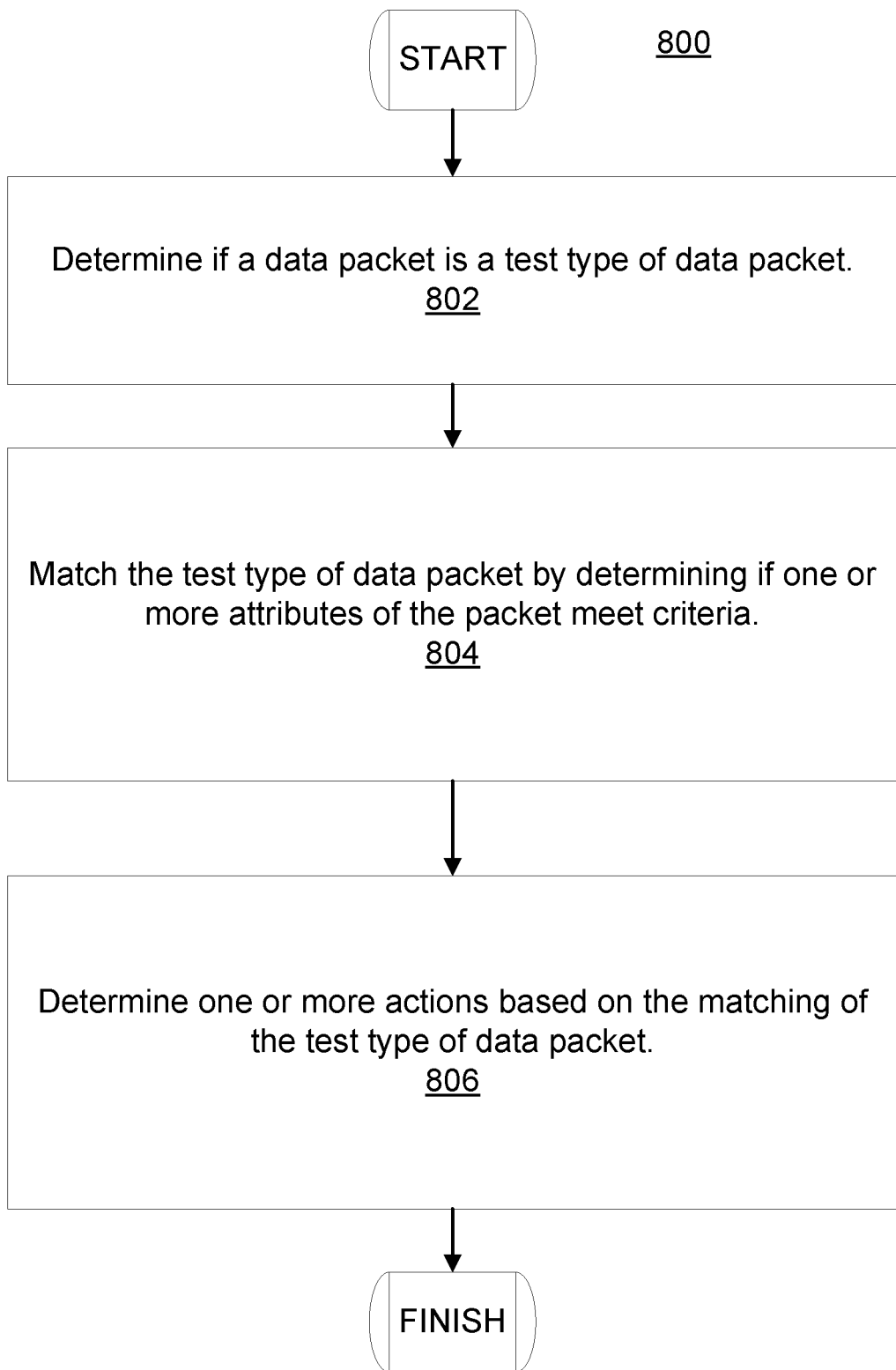
FIG. 8 illustrates an example flowchart for techniques for operation of a packet checker.

FIG. 8 illustrates flowchart 800 that illustrates techniques for operating a packet checker, such as packet checker 704. At 802, a determination can be made if a data packet is a test type of data packet. The determination can be made by examining certain field(s) of a data packet and/or a checksum or other integrity check of packet data. For example, a debugger identifier field can be examined to determine if the debugger identifier field contains a certain field. An integrity check can be performed on the debugger identifier field value and/or other values of test information to generate a checksum or similar value. A test type of data packet can be identified if the checksum or similar value matches and expected value. Otherwise, the data packet may not be a test type of data packet or it may have become corrupted. A test type of data packet may be a data packet generated by a packet generator, such as packet generator 303, and may include identifying characteristics that can be used to differentiate the packet from a non-test type of data packet. At 804, a test type of data packet can be matched by examining one or more fields of the test type of data packet. The matching can be used to perform one or more specific actions for only certain test type(s) of data packets. For example, a certain action may be performed for test type of data packets generated by a specific packet generator. The actions can be configurable such that certain action(s) are performed for certain match(es). Furthermore, the matching can include wildcard matching of field(s) to match on, for example, ranges of values of fields. At 806, the one or more actions can be performed based on the matching. The one or more actions can include, without limitation, starting or stopping packet generator(s) or packet checker(s), generating an interrupt, performing latency measurement(s), updating or generating a signature, incrementing a counter, etc.

Figure 9:
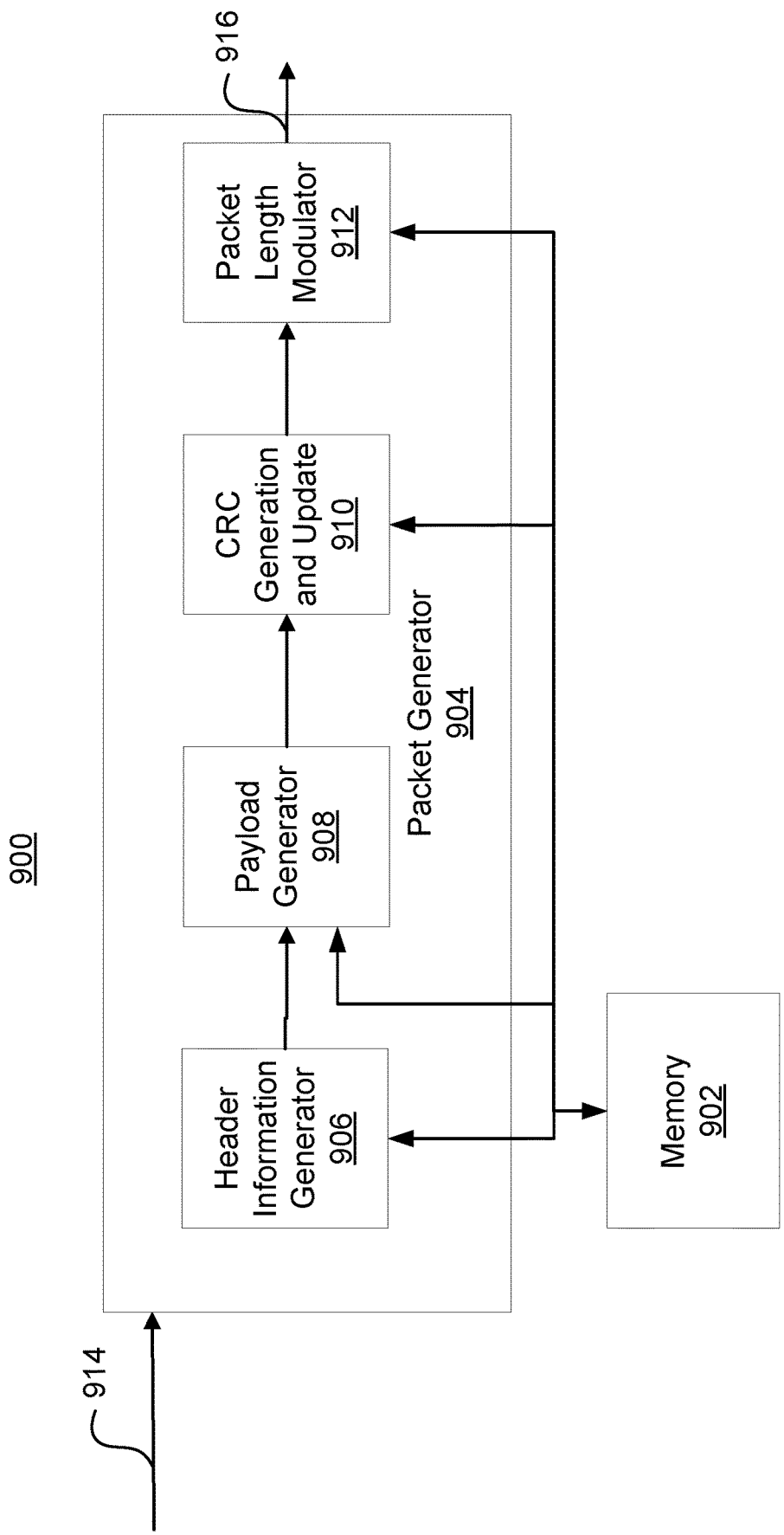
FIG. 9 illustrates an example packet generator.

FIG. 9 illustrates a device 900 that can include packet generator 904. Packet generator 904 can be similar to packet generator 302. Device 700 can be similar to device 300, 200, or 100. Packet generator can, upon receiving a signal 914, generate one or more packets 916. Signal 914 can be generated by a CPU (such as CPU 104), a packet checker (such as packet checker 704), or by device 900 (for example, at a certain time). Signal 914 can be received via a control plane of device 900. Packet generator can include a header information generator 906. As disclosed herein, header information can take the form of header(s), footer(s) or other field(s). Header information generator 906 can retrieve and/or modify template(s) stored in memory 902.

Memory 902 can be populated with header(s) of footer(s) by a CPU, for example. Each of the headers can be selected for insertion into a generated data packet. In certain embodiments, the template (s) can be modified by header information generator 906. For example, certain field(s) of a template can be modified by, for example, incrementing or decrementing certain fields, certain fields may be randomized, etc.

Payload generator 908 can similarly generate a packet payload for a generated data packet in several manners. For example, the packet payload can include random or pseudo-random values. Data to populate packet a payload data can be retrieved from memory 902. Packet payload(s) or packet payload template(s) may be stored within memory 902. Packet payload template(s) may be modified by payload generator 908 similar to the header information generator 906 modification of template(s). Payload generator 908 can vary lengths of packet payloads depending on one or more rules and/or an amount of data packet traffic received or processed at network device 900. The packet payload can optionally be populated with test information, as further described for FIG. 4 to generate a test type of data packet.

As disclosed herein, memory 902 can store one or more profiles for packet payload and/or header information generation. The profiles can include, for example, various attributes of data packets and corresponding percentages. The percentages can indicate a target number of data packets generated with the corresponding percentage. For example, a profile can indicate that data packets are targeted to be generated with 50% of length 1 and 50% of length 2. Memory 902 can store various profiles that may be selected for generation of data packet(s) at a given time. The profiles and/or rules may also contain various header information, packet payload and/or template information to generate data packets. The packet payloads may also indicate types of data packets and corresponding fields (e.g., IP-in-IP, GRE, multiple levels of encapsulation, length, checksum, etc.). Profiles can also include information defining a route at which packets are to be generated, types of packets, etc.

CRC Generation and Update 910 can include logic to generate one or more CRC, update length field(s), checksum(s), or other data integrity fields based on the packet payload and header information respectively generated by payload generator 908 and header information generator 906. The CRC and/or checksum(s) may be generated or retrieved from memory 902 for each generated data packet. In certain embodiments, a CRC or checksum may be retrieved that corresponds to data field(s) that have been modified by packet generator 904. As such, CRC Generation and Update 910 logic may modify certain field(s) of the packet payload and/or header information to match preselected CRC and/or checksum values in order to expedite data packet generation.

Packet Length Modulator 912 can be used to alter length(s) of generated data packet(s). The length(s) can be modified based upon a profile stored in memory 902, for example. In certain embodiments, Packet length modulator 912 can vary a length of a generated data packet based upon a detected interframe gap size. For example, a length of a generated packet can be altered to fit within an available interframe gap between network packets of a sequence. By modifying the length of the generated data packet, integrity of the sequence can be maintained. For example, the generated data packet may be inserted into the sequence of data packets without over exceeding a threshold data transfer rate for the sequence. Memory 902 can be embedded within packet generator 904 and/or shared between several packet generators (or other logic devices) of a network device).

In certain embodiments, a specific dummy test type of data packet can be generated by a packet generator. The dummy packet can be generated and processed by a packet processor. The dummy test type of data packet can always be trapped (e.g., normal packet processor routing decisions ignored). One or more sideband signals can be used between a packet generator and a packet processor, for example, to enable this functionality. These signals can be used to signal trapping of the dummy packet without effecting routing decisions by the pipeline. The dummy packet can then be read by a CPU, for example to determine if the routing pipeline is operating as expected and/or to help and identify an error in the packet processor's operation.

Figure 10:
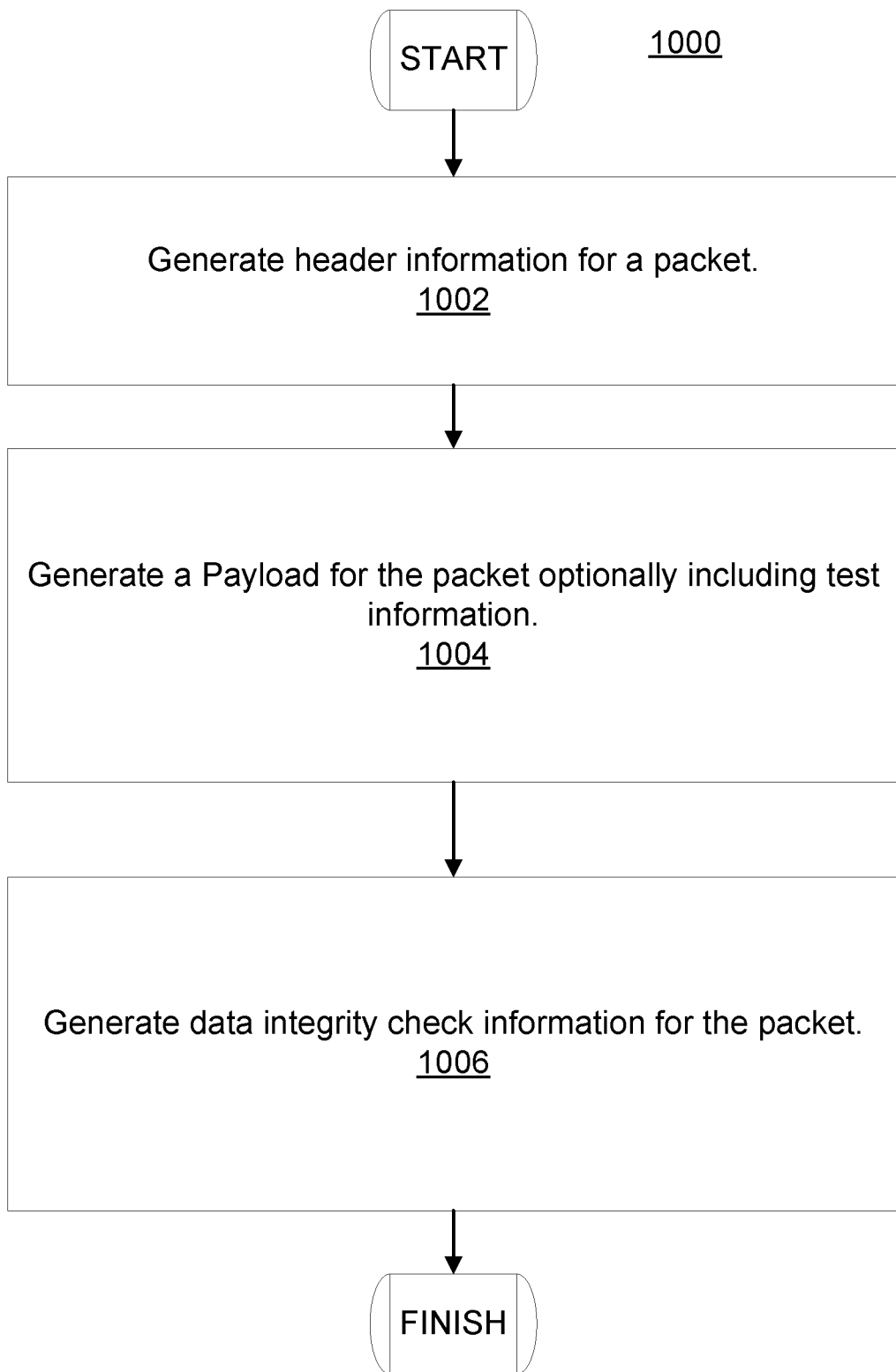
FIG. 10 illustrates an example flowchart for techniques for operation of a packet generator.

FIG. 10 illustrates flowchart 1000 that illustrates techniques for operating a packet generator, such as packet generator 904. At 1002, header information is generated for a data packet. At 1004, a packet payload can be generated for the test type of data packet. The packet payload can include one or more test field(s) (which can store test information) to differentiate the generated packet from non-test type of data packets. The test field(s) can include a debugger identifier. Portions of the packet payload can be randomized, patterned, and/or sequential. At 1006, a data integrity check, such as a CRC or checksum, can be generated for the packet and/or the header information or packet payload modified to match a CRC or checksum.

Figure 11A:
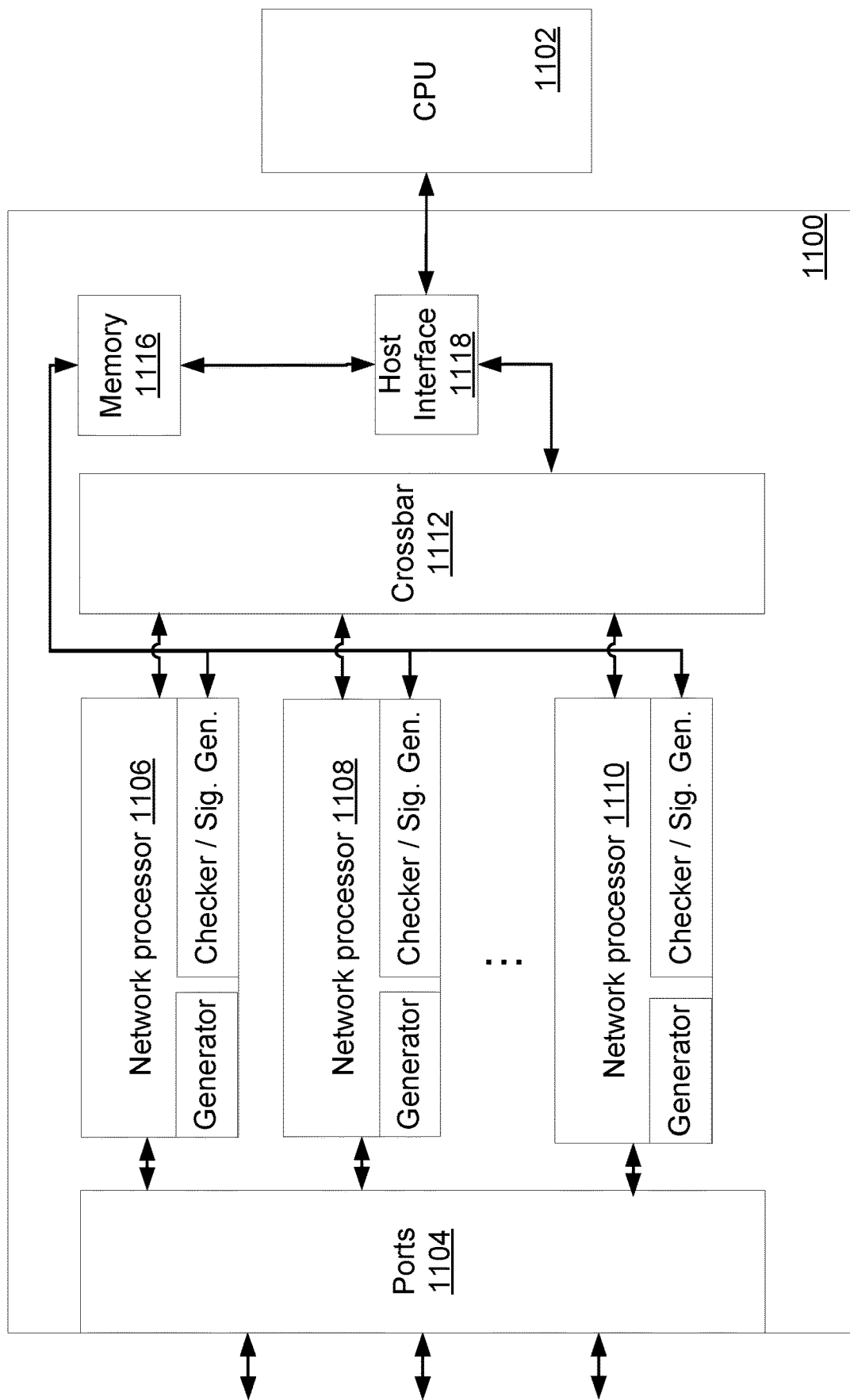
FIG. 11A illustrates an example network device with a plurality of packet generators and packet checkers and corresponding signature generation logic.

FIG. 11A illustrates a network device 1100 that can be similar to network device 500, 300, 202, or 102. Network device 1100 can include a plurality of network processors 1106, 1108, and 1110 that can each correspond to a packet checker, and a packet generator. Each of network processors 1106, 1108, and 1110 can include functionality of test logic module 502. The network processors 1106, 1108, and 1110 can be connected via crossbar 1112, that can be similar to crossbar 518. Network device 1100 can be coupled to CPU 1102 that can be similar to CPU 104 via host interface 1118, which can be similar to host interface 112.

Network device 1100 can include a plurality of ports 1104 that can be similar to interfaces 226. As disclosed herein, each of ports 1104 can correspond to a network processor (e.g., network processors 1106, 1108, and 1110). Each of packet checkers of network processors 1106, 1108, and 1110 can include signature generation logic (as illustrated in FIG. 7 as signature generation logic 708). Each of the packet checkers, in any combination, can generate a signature that represents data gathered during checking and/or routing of data packets, as described herein regarding signature generation logic 708. The signature can be stored within memory 1116. Memory 1116 can be embedded within any of network processors 1106, 1108, or 1110, or shared between processors or other logic blocks. Memory 1116 can be accessed by CPU 1102 to read signature(s) stored therein. Generation of the signature can relieve CPU 1102 of reading and processing a plurality of individual values of data as well as minimizing data link bandwidth usage between network device 1100 and CPU 1102.

One example of signature generation can utilize a bloom filter. For example, signature generation logic can generate a plurality of hash values from data packet fields and set corresponding bits in the signature depending on the results of hashing information from within the data packet field(s). For example, the results can be written over an existing signature such that the result is a logical OR of the value of a bit within the signature and the value being written. By examining the signature, a determination can be made if a packet containing specific value(s) within specific field(s) was identified by network device 1100. A bloom filter type of signature can provide a false positive, but may not provide a false negative. In other words, a determination can be made if a certain data packet was not processed by network device 1100, but a determination that a data packet was processed by network device 1100 may not be determinable with one hundred percent accuracy. However, using techniques disclosed herein (such as generating test information with specific packet checker IDs), a test pattern of packets can be generated that distributes test types of data packets across packet checkers and avoids bloom filter collisions (assuming the device under test is operating correctly). For example, each field that is hashed to generate a signature can be populated with information predetermined to avoid collisions. Thus, a test pattern can be created that generates a bloom filter data structure that can be analyzed to determine whether all of the data packets of the test pattern were generated and/or routed properly. In certain embodiments, cyclic redundancy check (CRC) generation engine(s) can be used to perform hashing operations to generate a signature based on one or more fields of a data packet. The fields can include, for example, a port number corresponding to the generated packet, a header/footer number, a packet checker identification field, and/or a sequence field. Signature generation logic can be configured to update a signature value and only update the value if a hash results in a different value than what is stored. Signature generation logic can be configured to compare a generated signature to one stored in memory and, depending on the result, signal CPU 1102, for example, via an interrupt or other signal.

Figure 11B:
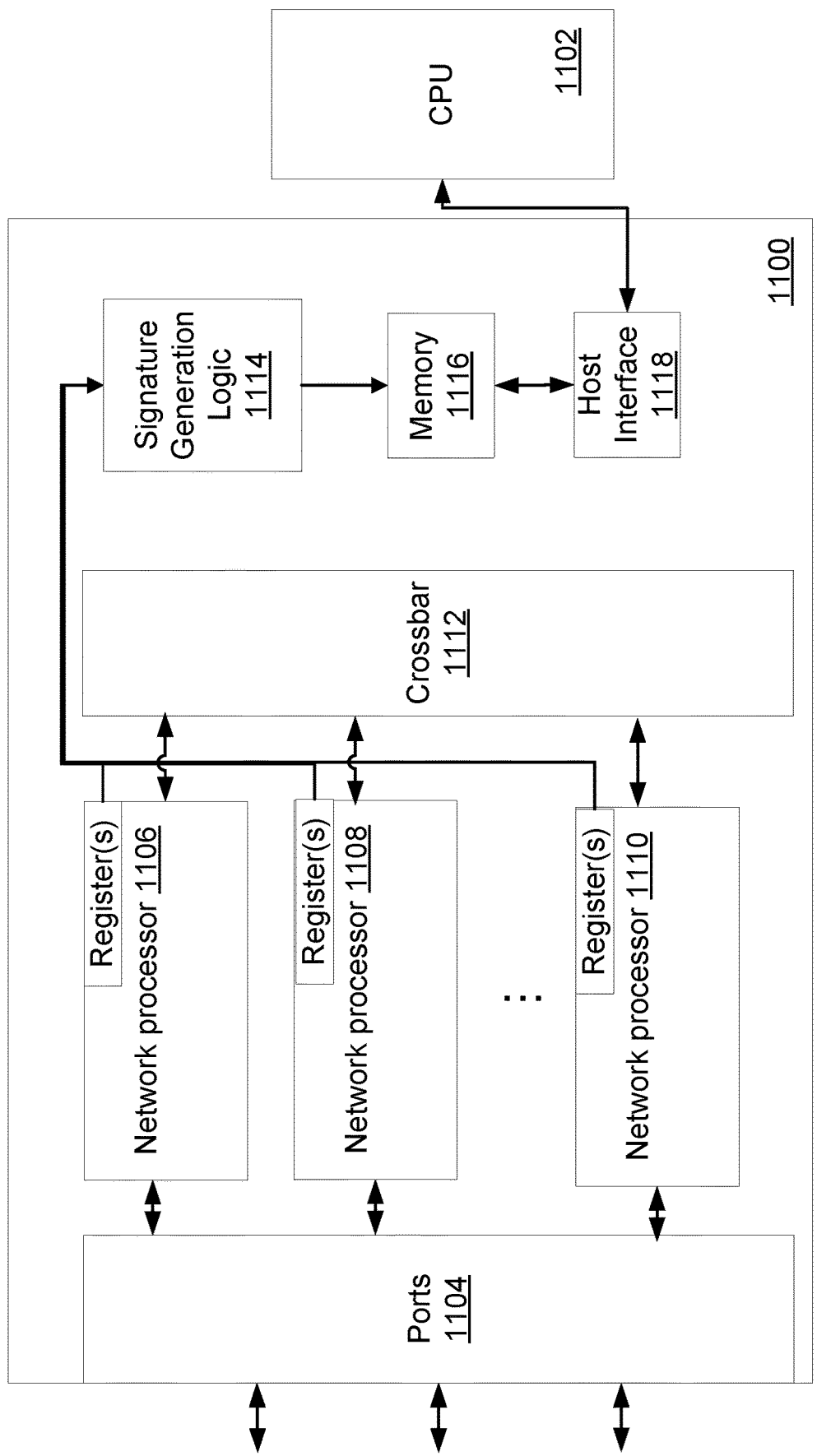
FIG. 11B illustrates another example network device with a plurality of packet generators and packet checkers and corresponding shared signature generation logic.

FIG. 11B represents an example embodiment of network device 1100 wherein signature generation logic 1114 is shared by a plurality of network processors (1106, 1108, and 1110). Network processors 1106, 1108, and 1110 can include register(s) or other memory constructs to store information therein. Signature generation logic 1114 can be configured to generate a signature that corresponds to a plurality of values of data stored within register(s) of network device 1100. The signature can condense data contained within the register(s) such that one signature represents corresponding data in a plurality of register(s). For example, a signature can indicate a number of network addresses that are received by network device 1100. In certain embodiments, the signature can be generated from memory of network device 1100 in addition to or instead of the register(s). The signature can also be generated from data passed to signature generation logic 1114 via a bus, for example. The generated signature can be stored within memory 1116 of device 1100 for access by CPU 1102.

Example Use Cases

The following are example use cases for techniques disclosed herein.

Pre-Silicon Testing

Prior to manufacturing (referred to as pre-silicon) an integrated circuit for a network device, the functionality of the network device can be tested via simulation. As described herein, the pre-silicon models (simulation, functional, gate netlist, etc.) may include the packet generator(s) and/or packet checker(s) as test logic for each packet processor already designed into the pre-silicon model. The integration of the test logic into the model itself at a per packet processor granularity allows for much deeper penetration and variance of the test vectors and reduces reliance on artificial debug hooks into the environment. These techniques can be used to validate the simulation and/or the integrated circuit. The distribution and integration of the packet generators and packet checkers can also enable repeatable regression test suites that can be run as a network device design is refined over time. Furthermore, stress test suites can be generated in addition to or as part of the regression test suites.

FPGA and Post-Silicon Testing

Utilizing a plurality of packet generators and/or packet checkers within a single device can enable synchronization of packet generation across a plurality of ports of a network device which can aid in corner-case functionality of the device (e.g., functionality that a network device may have a low probability of being subjected to during deployment and/or test). The ability to generate test types of data packets at a same rate as can be processed by a network device across multiple ports/packet processors can be used to saturate a network device, for example. Saturating the device can aid in corner case testing, stress testing, verification of crossbar design, and/or power usage testing, for example. Furthermore, multiple test engineers can work in parallel by developing test suites on isolated portion(s) of an FPGA or integrated circuit. Furthermore, one integrated circuit can be used in external mode to generate stimuli for a second integrated circuit (under test). Furthermore, use of dedicated and/or external test equipment can be minimized.

Silicon Reliability Testing

As disclosed herein, the packet generator(s) can be used to saturate a network device. Saturation of the network device can aid in reliability testing by aiding in generation of test suites for life cycle reliability testing (e.g., a network device can be stressed beyond what the network device is specified to withstand during its lifetime, thus the time of the test can be shortened while simulating stress that the device will be subjected to during its lifetime). Furthermore, stress testing can be used to identify devices that may fail due to manufacturing imperfections (e.g., infant mortality devices) without the need to maintain expensive third party test equipment.

Software Testing

Techniques disclosed herein can be used to inject errors into particular packets or introduce a test packet (with an error) into a sequence of packets. These errors can be used to detect, identify, and troubleshoot error in a hardware abstraction layer, software development kit, or development software/board. Application layer performance testing can be supported by generating relatively high traffic-rate of test types of data packets through a network for device(s) of a network.

Post-Deployment Testing

After a network device is deployed into a network, the techniques disclosed herein can be used to test the network device. Network infrastructure (such as cables) can be tested using near-end and far-end loopback tests (at full lines rates) individually or on a plurality of ports. The loopback test(s) can be used to test a network device in isolation or after it is deployed into a network. The network may be used to route non-test type of data packets between network devices of the network. After a problem with a specific device is determined, internal tests can then be run on the network device to further characterize the error. Furthermore, latency information can be determined for data packet(s) that are routed through the network.

One example usage scenario is that a network device with integrated test logic disclosed herein can be added to an existing network. The network may optionally perform self-testing using internal mode testing techniques disclosed herein, for example. The network device may then proceed to perform a coordinated network test with neighboring or other network devices within the network using external testing modes disclosed herein. The internal and/or internal testing may be performed whenever the network device is powered/initiated, periodically, and/or at command. These internal and external tests can be performed while non-test traffic is still being routed.

Stress testing can be used to, for example, characterize or identify a fault on a certain path of a network. For example, a relatively large number of test type of data packets can be injected over path(s) of a network and error statistics recorded. The statistics can aid in identifying, at a level of granularity, a location of a possible fault. Additional stress tests can be run at increasingly targeted location(s) of a network to further characterize/locate the fault. Such testing may be difficult using simple single packet (e.g., pinging) techniques as certain errors may be intermittent and difficult to identify without stress testing.

Example Techniques

Figure 12:
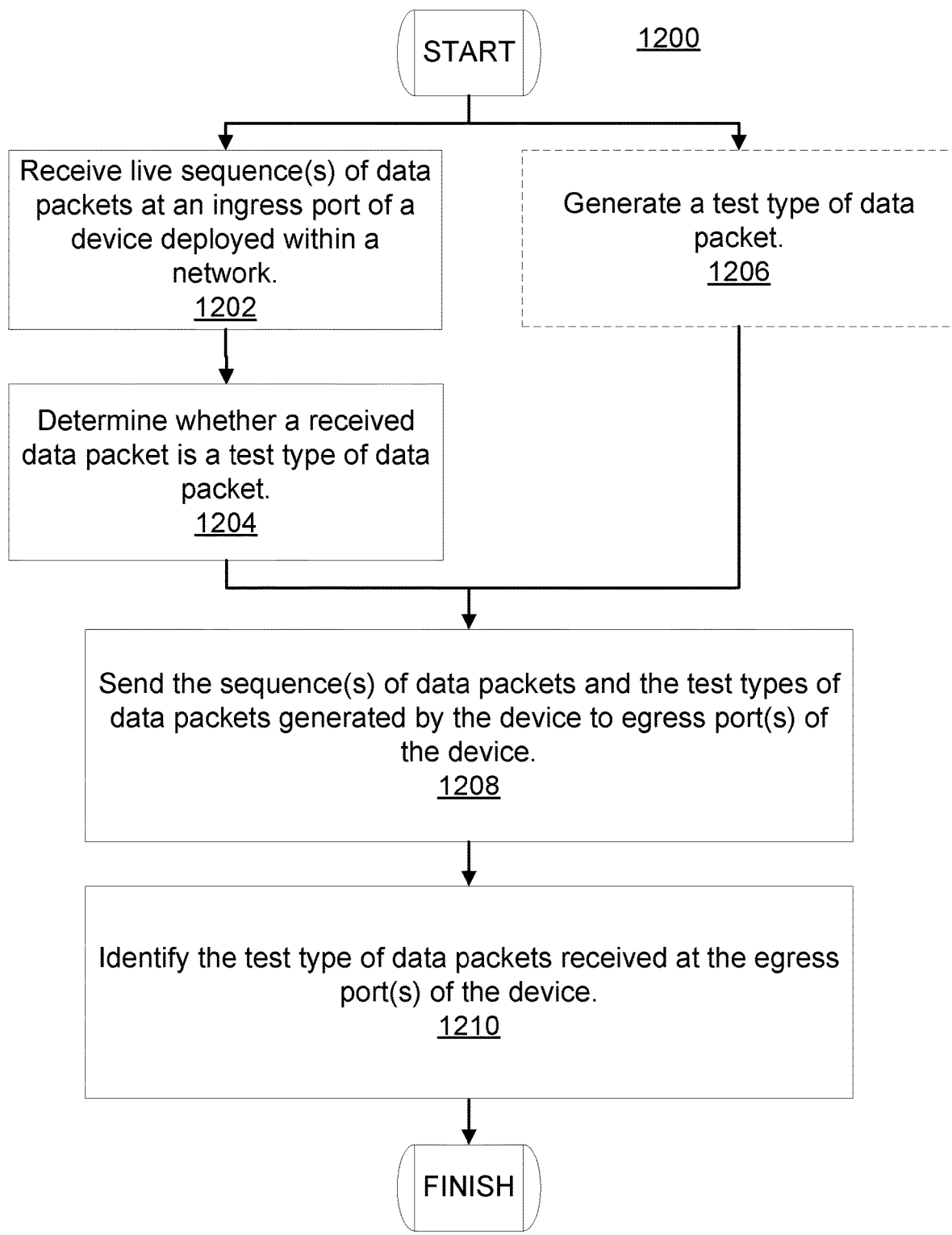
FIG. 12 illustrates an example flowchart for techniques to test a network device during live deployment.

FIG. 12 illustrates a flowchart 1200 for implementing techniques for testing a network device during live deployment within a network. As disclosed herein, testing a network device after it is deployed into a network and is actively routing sequences of network packets through the network may present difficulties. For example, it may be difficult to characterize and/or recreate live traffic flow patterns that induce errors within a network device. Live traffic flow patterns may be difficult to characterize because it may be difficult to identify the patterns that induce a specific error, the volume of traffic flow may be difficult to recreate, adding test equipment to a network may be difficult and/or impossible, etc. Furthermore, it is highly desirable to identify root-cause(s) of failed links and performance issues in a live network without significantly interrupting live traffic or off-lining portions of the network. Using techniques of the disclosure, network devices can be used in a live deployment scenario for normal network operations as well as for testing and debugging purposes.

At 1202, live sequence(s) of network packets may be received at an ingress port of a network device that is deployed within a network. The live sequence(s) of network packets may be between network devices communicating on the network. At 1204, a determination can be made (by a packet checker coupled to the port, for example) if some of the received data packets are test types of data packets. For example, a test type of data packet may be generated by a packet generator of another network device and received at the ingress port of the network device under consideration, both operating in an external mode. If so, test information of the test type of data packet received at an ingress port can be examined to aid in characterization of an error and/or validation of network device/infrastructure operations. At optional step 1206, one or more test types of packets can be generated by a packet generator of the network device operating in internal mode. At 1208, the sequence(s) of data packets can be routed by the network device that received the sequence(s) of network packets to an egress port of the network device. Routing can be performed by a packet processor, for example. In certain embodiments, the sequence(s) can be live sequences received at an ingress port while a network device is deployed. While the live sequence(s) are received and routed, test type of data packet(s) can be contemporaneously received and/or generated. Thus, life traffic sequence(s) may be routed and/or test type of data packet(s) contemporaneously received and/or processed. At 1210, test types of data packets generated at 1206 can be identified to aid in troubleshooting and/or verifying operations of the network device that routed the test type of data packet. The test type of data packets can be generated, for example, at egress port(s) of a network device by one or more packet checkers using techniques disclosed herein.

Figure 13:
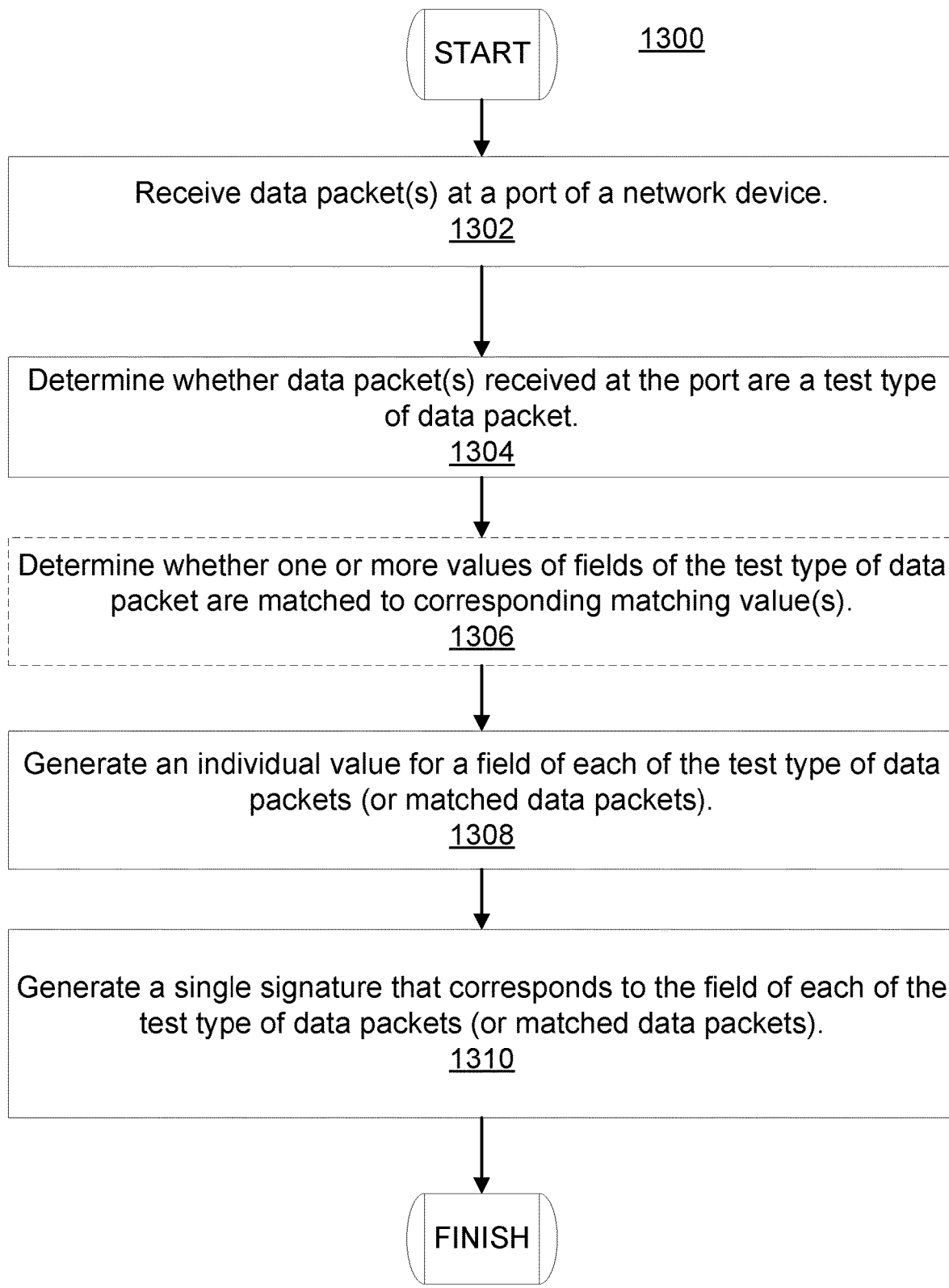
FIG. 13 illustrates an example flowchart for techniques to generate a signature for a network device.

FIG. 13 illustrates a flowchart 1300 for implementing techniques of the disclosure concerning generating of a signature. As disclosed herein, a signature can be generated that corresponds to a plurality of network packets and/or operations of a network device. For example, a common field shared among network packets can be used to generate a single common value. The single common value can form a signature or a portion of a signature (such as an element of bloom filter array). The common value can be used to deduce information pertaining to the network packets used to generate the common value.

At 1302, data packets can be received at a port of a network device. The port can be an ingress port or an egress port (e.g., the packets can be generated by an external device or internally by the network device). At 1304, a determination can be made as to whether some of the received data packets are test types of data packets by, for example, a packet checker coupled to an ingress port. At optional step 1306, one or more fields of test information of the test type of data packets can further be used for matching purposes so that only certain ones of the test type of data packets are used for signature generation. The remaining may be dropped or passed. At 1308, a value can be generated corresponding to data of a field of each of the test type of data packets (such as a field within test information). For example, hashing can be performed on the data of the field to generate a respective value for each field and/or packet. Hashing can project a value from a set with many members to a value from a set with a fixed number of (relatively fewer) members. The results of the hashing may be used to generate or augment an already generated value that represents the data in the field of all of the data packets. For example, a hash may result in a sequence of 1 or 0 values that may be logically ORed together to obtain an updated value that represents all of the data packets. At 1310, a signature can be generated that represents the values of the field for each of the data packets.

The signature can be used in a variety of manners. For example, the signature can be analyzed to determine if certain data packet(s) were or were not received. For example, specific sequence(s) of test type of data packets can be generated to be routed through certain port(s) of a network device. The packet checker(s) of the network device can generate signature(s). The signature(s) can then be analyzed to verify if the anticipated test type of data packets were (or were not) received at he expected ports. Use of the signature can optimize memory storage space, bandwidth utilization, and/or processor utilization to analyze the test type of data packet(s).

Computing Systems

Figure 14:
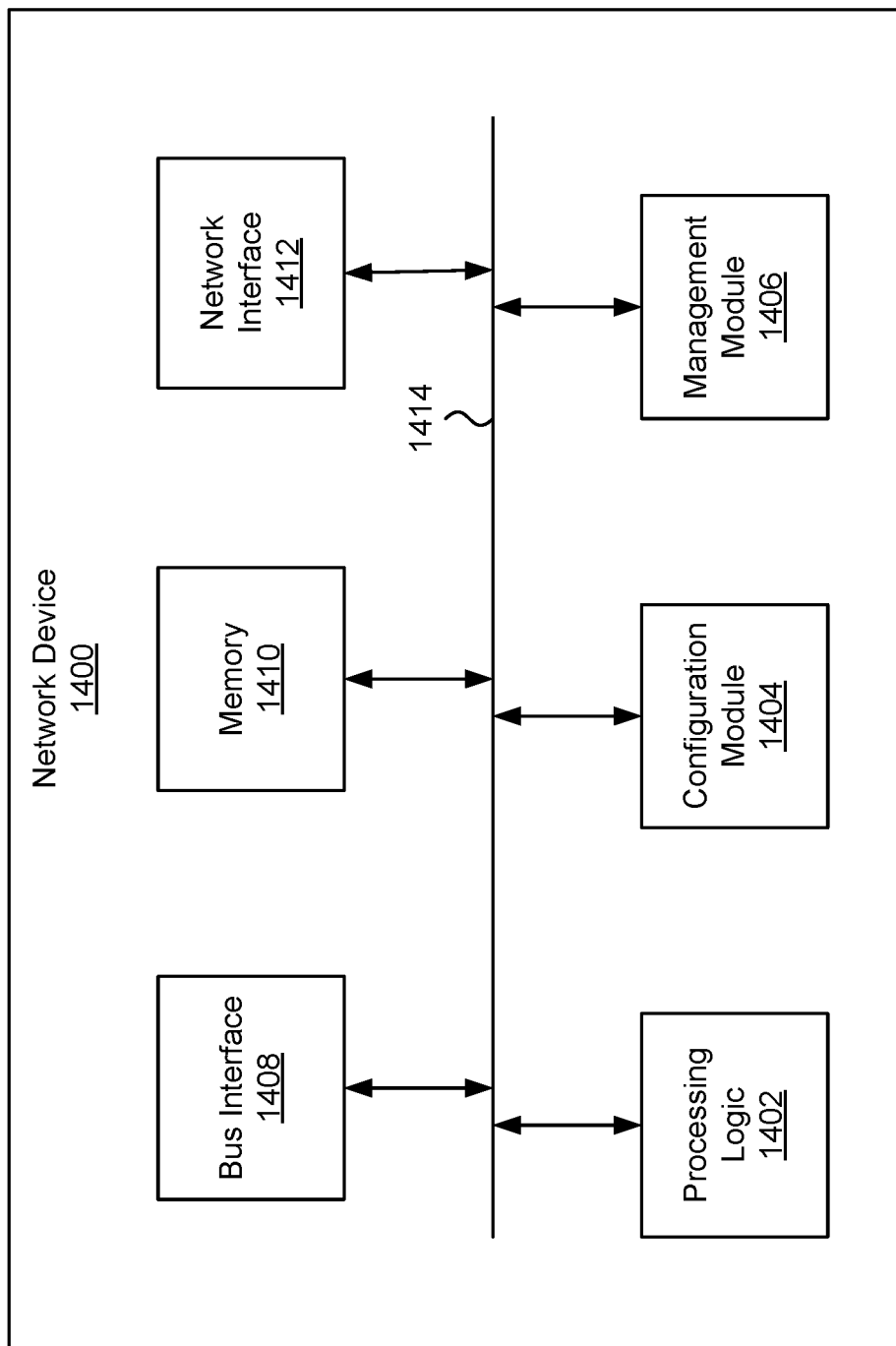
FIG. 14 illustrates an example of a network device, according to certain aspects of the disclosure.

FIG. 14 illustrates an example of a network device 1400. Functionality and/or several components of the network device 1400 may be used without limitation with other embodiments disclosed elsewhere in this disclosure, without limitations. A network device 1400 may facilitate processing of packets and/or forwarding of packets from the network device 1400 to another device. As referred to herein, a "packet" or "data packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 1400 may be the recipient and/or generator of packets. In some implementations, the network device 1400 may modify the contents of the packet before forwarding the packet to another device. The network device 1400 may be a peripheral device coupled to another computer device, a switch, a router or any other suitable device enabled for receiving and forwarding packets.

In one example, the network device 1400 may include processing logic 1402, a configuration module 1404, a management module 1406, a bus interface module 1408, memory 1410, and a network interface module 1412. These modules may be hardware modules, software modules, or a combination of hardware and software. In certain instances, modules may be interchangeably used with components or engines, without deviating from the scope of the disclosure. The network device 1400 may include additional modules, not illustrated here, such as components discussed with respect to the nodes disclosed in FIG. 15. In some implementations, the network device 1400 may include fewer modules. In some implementations, one or more of the modules may be combined into one module. One or more of the modules may be in communication with each other over a communication channel 1414. The communication channel 1414 may include one or more busses, meshes, matrices, fabrics, a combination of these communication channels, or some other suitable communication channel.

The processing logic 1402 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1402 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1402 may be stored on a computer-readable storage medium, for example, in the form of a computer program. The computer-readable storage medium may be non-transitory. In some cases, the computer-readable medium may be part of the memory 1410. As used herein, the term "logic," can refer to circuitry or other hardware components such as the aforementioned processor(s).

The memory 1410 may include either volatile or non-volatile, or both volatile and non-volatile types of memory. The memory 1410 may, for example, include random access memory (RAM), read only memory (ROM), Electrically Erasable Programmable Read-Only Memory (EEPROM), flash memory, and/or some other suitable storage media. In some cases, some or all of the memory 1410 may be internal to the network device 1400, while in other cases some or all of the memory may be external to the network device 1400.

The memory 1410 may store an operating system comprising executable instructions that, when executed by the processing logic 1402, provides the execution environment for executing instructions providing networking functionality for the network device 1400. The memory may also store and maintain several data structures and routing tables for facilitating the functionality of the network device 1400.

In some implementations, the configuration module 1404 may include one or more configuration registers. Configuration registers may control the operations of the network device 1400. In some implementations, one or more bits in the configuration register can represent certain capabilities of the network device 1400. Configuration registers may be programmed by instructions executing in the processing logic 1402, and/or by an external entity, such as a host device, an operating system executing on a host device, and/or a remote device. The configuration module 1404 may further include hardware and/or software that control the operations of the network device 1400.

In some implementations, the management module 1406 may be configured to manage different components of the network device 1400. In some cases, the management module 1406 may configure one or more bits in one or more configuration registers at power up, to enable or disable certain capabilities of the network device 1400. In certain implementations, the management module 1406 may use processing resources from the processing logic 1402. In other implementations, the management module 1406 may have processing logic similar to the processing logic 1402, but segmented away or implemented on a different power plane than the processing logic 1402.

The bus interface module 1408 may enable communication with external entities, such as a host device and/or other components in a computing system, over an external communication medium. The bus interface module 1408 may include a physical interface for connecting to a cable, socket, port, or other connection to the external communication medium. The bus interface module 1408 may further include hardware and/or software to manage incoming and outgoing transactions. The bus interface module 1408 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1408 may include the physical layer for any of these bus protocols, including a connector, power management, and error handling, among other things. In some implementations, the network device 1400 may include multiple bus interface modules for communicating with multiple external entities. These multiple bus interface modules may implement the same local bus protocol, different local bus protocols, or a combination of the same and different bus protocols.

The network interface module 1412 may include hardware and/or software for communicating with a network. This network interface module 1412 may, for example, include physical connectors or physical ports for wired connection to a network, and/or antennas for wireless communication to a network. The network interface module 1412 may further include hardware and/or software configured to implement a network protocol stack. The network interface module 1412 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 1400 may include multiple network interface modules, each configured to communicate with a different network. For example, in these implementations, the network device 1400 may include a network interface module for communicating with a wired Ethernet network, a wireless 802.11 network, a cellular network, an Infiniband network, etc.

The various components and modules of the network device 1400, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 15.

Figure 15:
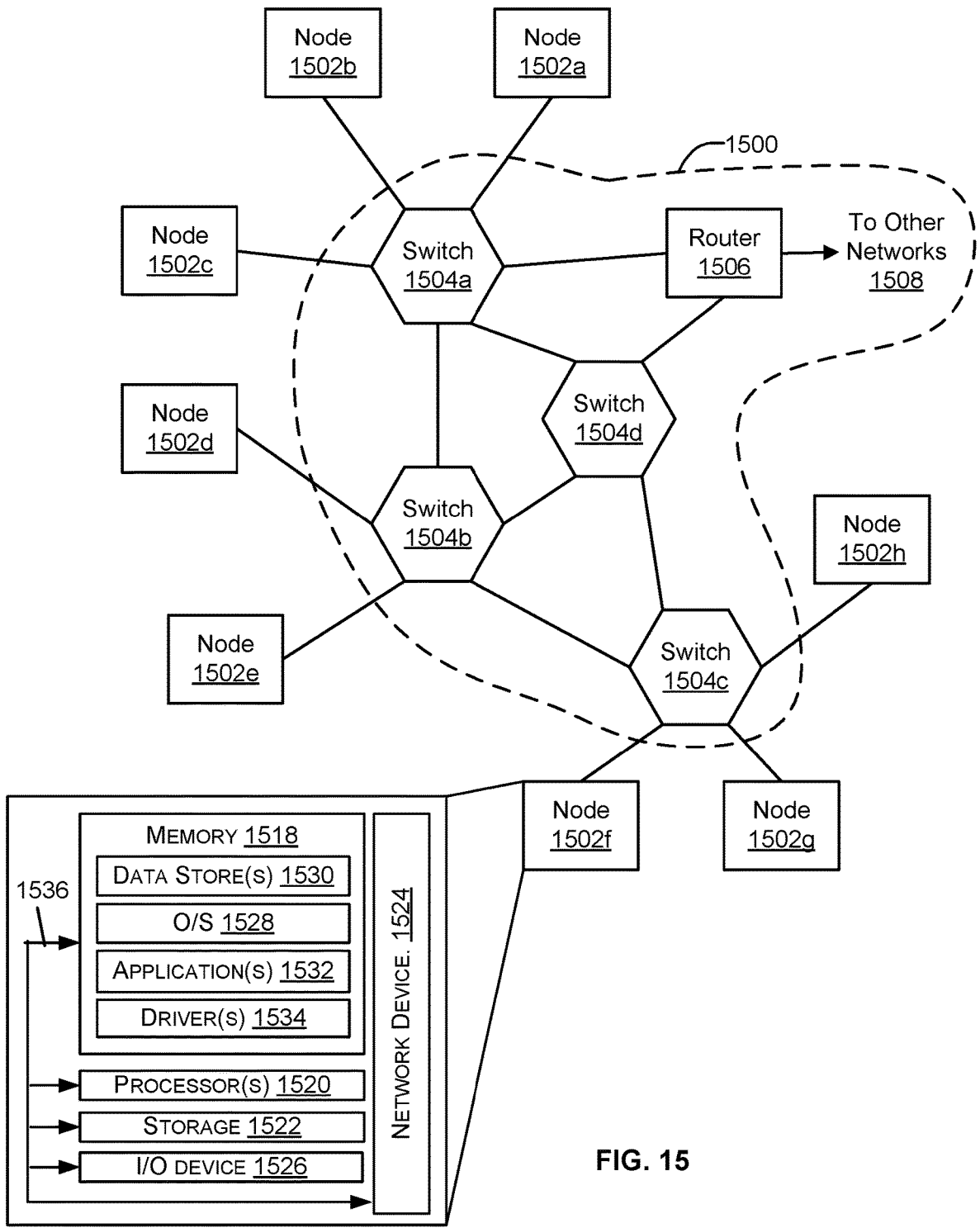
FIG. 15 illustrates an example architecture for features and systems described herein that includes one or more service provider computers and/or a user device connected via one or more networks, according to certain aspects of the disclosure.

FIG. 15 illustrates a network 1500, illustrating various different types of network devices 1400 of FIG. 14, such as nodes comprising the network device, switches and routers. In certain embodiments, the network 1500 may be based on a switched architecture with point-to-point links. As illustrated in FIG. 15, the network 1500 includes a plurality of switches 1504a-1504d, which may be arranged in a network. In some cases, the switches are arranged in a multi-layered network, such as a Clos network. A network device 700 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1504a-1504d may be connected to a plurality of nodes 1502a-1502h and provide multiple paths between any two nodes.

The network 1500 may also include one or more network devices 700 for connection with other networks 1508, such as other subnets, LANs, wide area networks (WANs), or the Internet, and may be referred to as routers 1506. Routers use headers and forwarding tables to determine the best path for forwarding the packets, and use protocols such as internet control message protocol (ICMP) to communicate with each other and configure the best route between any two devices.

In some examples, network(s) 1500 may include any one or a combination of many different types of networks, such as cable networks, the Internet, wireless networks, cellular networks and other private and/or public networks. Interconnected switches 1504a-1504d and router 1506, if present, may be referred to as a switch fabric, a fabric, a network fabric, or simply a network. In the context of a computer network, terms "fabric" and "network" may be used interchangeably herein.

Nodes 1502a-1502h may be any combination of host systems, processor nodes, storage subsystems, and I/O chassis that represent user devices, service provider computers or third party computers.

User devices may include computing devices to access an application 1532 (e.g., a web browser or mobile device application). In some aspects, the application 1532 may be hosted, managed, and/or provided by a computing resources service or service provider. The application 1532 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1508. Additionally, the user device(s) may be part of the distributed system managed by, controlled by, or otherwise part of the service provider computer(s) (e.g., a console device integrated with the service provider computers).

The node(s) of FIG. 15 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1532 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1502a-1502h may include at least one memory 1518 and one or more processing units (optionally referred to herein as processing modules) (or processor(s) 1520). The processor(s) 1520 may be implemented in hardware, computer-executable instructions, firmware, or combinations thereof. Computer-executable instruction or firmware implementations of the processor(s) 1520 may include computer-executable or machine-executable instructions written in any suitable programming language to perform the various functions described.

In some instances, the hardware processor(s) 1520 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1518 may store program instructions that are loadable and executable on the processor(s) 1520, as well as data generated during the execution of these programs. Depending on the configuration and type of the node(s) 1502a-1502h, the memory 1518 may be volatile (such as RAM) and/or non-volatile (such as ROM, flash memory, etc.). The memory 1518 may include an operating system 1528, one or more data stores 1530, one or more application programs 1532, one or more drivers 1534, and/or services for implementing the features disclosed herein.

The operating system 1528 may support nodes 1502a-1502h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1528 may also be a proprietary operating system.

The data stores 1530 may include permanent or transitory data used and/or operated on by the operating system 1528, application programs 1532, or drivers 1534. Examples of such data include web pages, video data, audio data, images, user data, and so on. The information in the data stores 1530 may, in some implementations, be provided over the network(s) 1508 to user devices 1504. In some cases, the data stores 1530 may additionally or alternatively include stored application programs and/or drivers. Alternatively or additionally, the data stores 1530 may store standard and/or proprietary software libraries, and/or standard and/or proprietary application user interface (API) libraries. Information stored in the data stores 1530 may be machine-readable object code, source code, interpreted code, or intermediate code.

The drivers 1534 include programs that may provide communication between components in a node. For example, some drivers 1534 may provide communication between the operating system 1528 and additional storage 1522, network device 1524, and/or I/O device 1526. Alternatively or additionally, some drivers 1534 may provide communication between application programs 1532 and the operating system 1528, and/or application programs 1532 and peripheral devices accessible to the service provider computer. In many cases, the drivers 1534 may include drivers that provide well-understood functionality (e.g., printer drivers, display drivers, hard disk drivers, Solid State Device drivers). In other cases, the drivers 1534 may provide proprietary or specialized functionality.

The service provider computer(s) or servers may also include additional storage 1522, which may include removable storage and/or non-removable storage. The additional storage 1522 may include magnetic storage, optical disks, solid state disks, flash memory, and/or tape storage. The additional storage 1522 may be housed in the same chassis as the node(s) 1502a-1502h or may be in an external enclosure. The memory 1518 and/or additional storage 1522 and their associated computer-readable media may provide non-volatile storage of computer-readable instructions, data structures, program modules, and other data for the computing devices. In some implementations, the memory 1518 may include multiple different types of memory, such as SRAM, DRAM, or ROM.

The memory 1518 and the additional storage 1522, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1518 and the additional storage 1522 are examples of computer storage media. Additional types of computer storage media that may be present in the node(s) 1502a-1502h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1502a-1502h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1502a-1502h may also include I/O device(s) 1526, such as a keyboard, a mouse, a pen, a voice input device, a touch input device, a display, speakers, a printer, and the like. The node(s) 1502a-1502h may also include one or more communication channels 1536. A communication channel 1536 may provide a medium over which the various components of the node(s) 1502a-1502h can communicate. The communication channel or channels 1536 may take the form of a bus, a ring, a switching fabric, or a network.

The node(s) 1502a-1502h may also contain network device(s) 1524 that allow the node(s) 1502a-1502h to communicate with a stored database, another computing device or server, user terminals and/or other devices on the network(s) 1500. The network device(s) 1524 of FIG. 15 may include similar components discussed with reference to the network device 1400 of FIG. 14.

In some implementations, the network device 1524 is a peripheral device, such as a PCI-based device. In these implementations, the network device 1524 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1408 may implement NVMe, and the network device 1524 may be connected to a computing system using a PCIe interface.

A PCI-based device may include one or more functions. A "function" describes operations that may be provided by the network device 1524. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1524 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 14, FIG. 15, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A device, comprising:
   an egress port;
   an integrated circuit coupled to the egress port, the integrated circuit comprising a packet generator, a packet processor, and a packet checker coupled between the egress port and the packet processor, wherein:
   the packet generator, when operating in an external mode, is configured to:
      generate a first data packet comprising a packet payload generated by the packet generator; and
      transmit the first data packet via the egress port; and
   the packet generator, when operating in an internal mode, is configured to:
      generate a second data packet comprising a packet payload generated by the packet generator; and
      transmit the second data packet to the packet processor internally within the integrated circuit to enable the packet processor to route the second data packet to the egress port via the packet checker.

2. The device of claim 1,
wherein the packet checker is configured to determine whether the packet processor routes the second data packet to the egress port.

3. The device of claim 2, wherein the packet checker is configured to verify that the packet processor correctly routes the second data packet to the egress port based on test information included in the second data packet.

4. The device of claim 3, wherein the packet checker is configured to determine, based on the test information included in the second data packet, an expected egress port of the device at which the second data packet is expected to be received; and
wherein the packet checker is configured to determine whether the packet processor correctly routes the second data packet to the egress port based on whether the egress port matches the expected egress port.

5. The device of claim 4, wherein the test information indicates a test operation of a plurality of test operations to be performed on the packet processor.

6. The device of claim 2, wherein the second packet is part of a test type of data packets;
wherein the packet processor is configured to route both test type of data packets and non-test type of data packets in both the internal mode and the external mode.

7. The device of claim 1, further comprising:
a host interface;
a configuration register coupled to the host interface and the packet checker; and
wherein the packet generator operates in the internal mode or the external mode depending on a corresponding value of the configuration register.

8. The device of claim 7, wherein the host interface is configured to receive one or more signals via a control plane to select a value of the configuration register.

9. The device of claim 1, wherein generating the first data packet or the second data packet includes generating header information including a header, wherein the header is generated based on data stored in memory of the device.

10. The device of claim 9, wherein the data includes a header template that is modified by the packet generator to generate the header.

11. The device of claim 1, wherein the packet generator, is configured to variably generate a plurality of packets at one of several rates.

12. The device of claim 11, wherein the packet generator is configured to vary, depending on a target generation rate:
a length of the second data packet; or
an inter-frame gap of time between the second data packet and a subsequently generated data packet.

13. The device of claim 11, wherein the packet generator is configured to:
include first test information in the packet payload of the first data packet to indicate that the first data packet is a test type of data packet; and
include second test information in the packet payload of the second data packet to indicate that the second data packet is the test type of data packet.

14. The device of claim 13, wherein the first test information include an identifier of the egress port.

* * * * *